(12) United States Patent
Hotta et al.

(10) Patent No.: US 11,962,735 B2
(45) Date of Patent: Apr. 16, 2024

(54) PRINTING SYSTEM SUSPENDING PRINTING AND PERFORMING ONE OF POST FEE-SETTLEMENT PROCESS AND RESTART PROCESS

(71) Applicant: Brother Kogyo Kabushiki Kaisha, Nagoya (JP)

(72) Inventors: Ayaka Hotta, Kitanagoya (JP); Shunsuke Minamikawa, Nagoya (JP); Tetsuya Okuno, Nagoya (JP); Haruka Azechi, Nagoya (JP); Yushi Deura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/933,876

(22) Filed: Sep. 21, 2022

(65) Prior Publication Data
US 2023/0031029 A1 Feb. 2, 2023

Related U.S. Application Data

(63) Continuation of application No. PCT/JP2021/010554, filed on Mar. 16, 2021.

(30) Foreign Application Priority Data

Mar. 31, 2020 (JP) ................. 2020-065129

(51) Int. Cl.
*H04N 1/00* (2006.01)
*G06F 3/12* (2006.01)
(Continued)

(52) U.S. Cl.
CPC ............... *H04N 1/34* (2013.01); *G06F 3/121* (2013.01); *G06F 3/1235* (2013.01);
(Continued)

(58) Field of Classification Search
CPC ............... H04N 1/34; H04N 1/00917
See application file for complete search history.

(56) References Cited

U.S. PATENT DOCUMENTS

2006/0070071 A1* 3/2006 Shimizu ............... G06Q 30/06
718/100
2010/0312721 A1* 12/2010 Terada .................. G07F 17/266
705/400
(Continued)

FOREIGN PATENT DOCUMENTS

JP 2003-167698 A 6/2003
JP 2007-086423 A 4/2007
(Continued)

OTHER PUBLICATIONS

English translation of the International Preliminary Report on Patentability (Chapter I) dated Sep. 29, 2022 (Application No. PCT/JP2021/010554)
(Continued)

*Primary Examiner* — Benjamin O Dulaney
(74) *Attorney, Agent, or Firm* — Merchant & Gould P.C.

(57) ABSTRACT

A printing system controls a printing member to perform printing based on a print job for which a charged fee is already settled. The printing system receives a first instruction to suspend the printing started by the printing member and suspends the printing started by the printing member in response to reception of the first instruction. The printing system receives a second instruction as to a post suspending process to be executed after the printing is suspended. The printing system performs one of a post fee-settlement process and a restart process, as the post suspending process. The post fee-settlement process is related to provision of a benefit corresponding to refunding at least part of the charged fee. The restart process is to restart the suspended (Continued)

printing to complete the print job after a reason that the first instruction is made is resolved.

17 Claims, 16 Drawing Sheets

(51) Int. Cl.
*G06Q 20/40* (2012.01)
*H04N 1/34* (2006.01)

(52) U.S. Cl.
CPC .......... *G06F 3/1253* (2013.01); *G06F 3/1274* (2013.01); *G06Q 20/407* (2013.01); *H04N 1/00917* (2013.01)

(56) References Cited

U.S. PATENT DOCUMENTS

| | | | | |
|---|---|---|---|---|
| 2012/0031968 | A1* | 2/2012 | Ohsugi | G06Q 20/28 235/375 |
| 2018/0018137 | A1* | 1/2018 | Yoshimura | G06F 3/1203 |
| 2018/0082270 | A1* | 3/2018 | Sun | G06Q 20/108 |
| 2018/0240116 | A1* | 8/2018 | Nuggehalli | G07F 17/266 |
| 2020/0106917 | A1* | 4/2020 | Kawamura | G06F 3/1203 |
| 2021/0233332 | A1* | 7/2021 | Wilson | G07G 3/006 |
| 2021/0294550 | A1* | 9/2021 | Sako | G06F 3/1259 |

FOREIGN PATENT DOCUMENTS

| | | | |
|---|---|---|---|
| JP | 2010-282413 A | 12/2010 | |
| JP | 2011-060003 A | 3/2011 | |
| JP | 2019-016013 A | 1/2019 | |

OTHER PUBLICATIONS

International Search Report (with English translation) and Written Opinion International Application No. PCT/JP2021/010554, dated Jun. 15, 2021 (11 pages).

Office Action issued in corresponding Japanese application 2020-065129. dated Jan. 31, 2024.

* cited by examiner

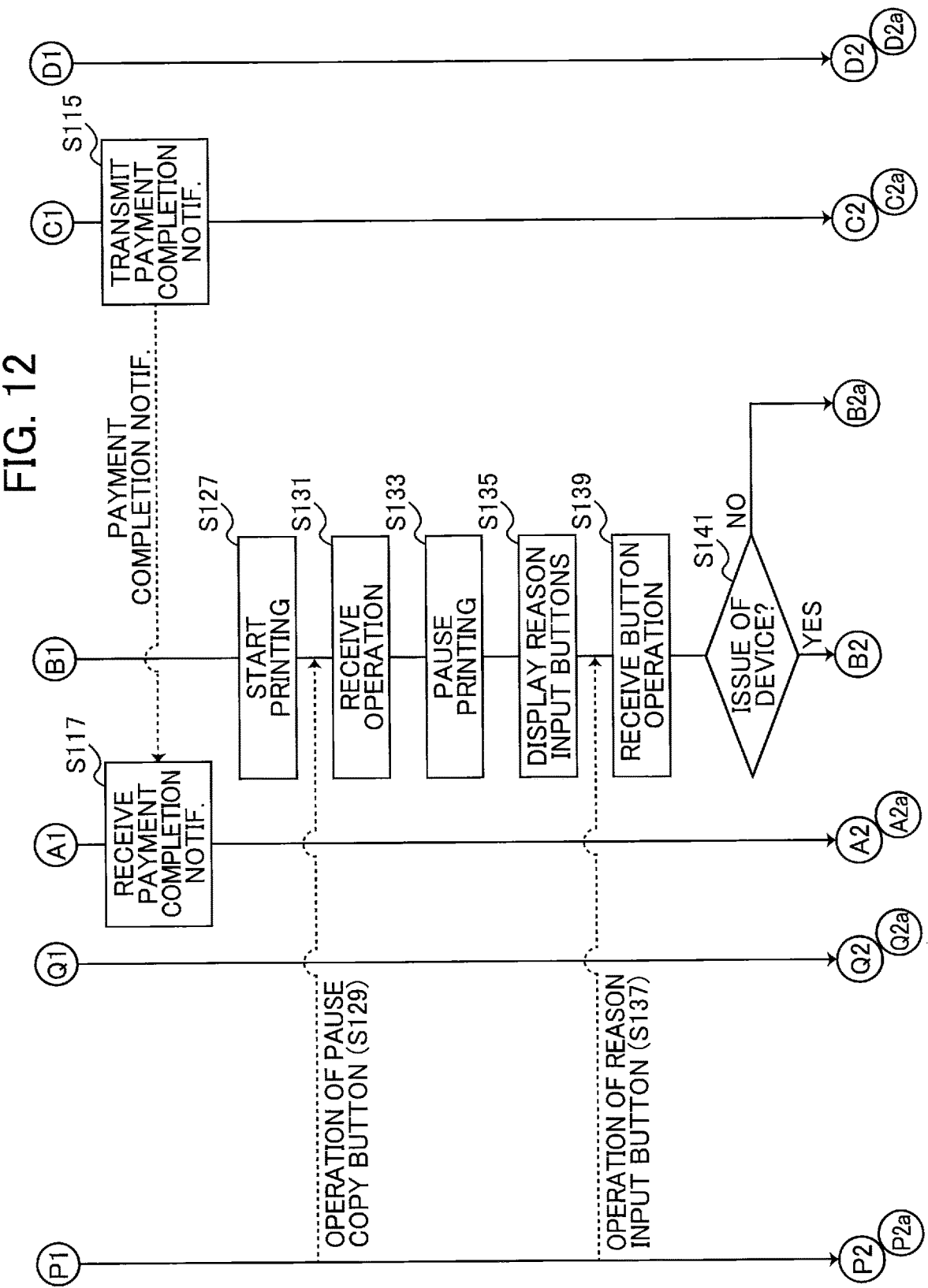

PRINTING SYSTEM SUSPENDING PRINTING AND PERFORMING ONE OF POST FEE-SETTLEMENT PROCESS AND RESTART PROCESS

REFERENCE TO RELATED APPLICATIONS

This application is a by-pass continuation application of International Application No. PCT/JP2021/010554 filed Mar. 16, 2021 claiming priority from Japanese Patent Application No. 2020-065129 filed Mar. 31, 2020. The entire contents of the international application and the priority application are incorporated herein by reference.

BACKGROUND ART

With a conventional image processing technology, if a user cancels a print job on a multifunction peripheral through an operation on the touchscreen after having completed an electronic payment for the job, the conventional device determines an amount to be refunded to the user by referencing the number of sheets that were printed and prints out a refund ticket specifying this refund amount in text. Some cases in which a user might cancel a print job include when the user realizes that the wrong image data was selected to be printed, when the user wishes to change the paper size or color setting, or when a problem occurs with the multifunction peripheral such as the multifunction peripheral running out of paper or the occurrence of a paper jam.

DESCRIPTION

The conventional information processing device stops printing immediately when an instruction is issued to interrupt a print job, thereby preventing any further unnecessary printing. Moreover, the device prints a refund ticket and issues a refund for settled charges in all cases. However, depending on the cause for the printing interruption, a better course of action might be to resolve the cause and restart printing without issuing a refund. The conventional technology described above gives no particular consideration for such cases.

In view of the foregoing, it is an object of the present disclosure to provide a printing system, a printing device, a printing program, and a printing method that improve user convenience by allowing different measures to be taken with regard to the refunding of settled charges after a user indicates a desire to stop a print, depending on the reason for the stoppage.

In order to attain the above and other object, the present disclosure provides a printing system. The printing system includes a printing member configured to perform printing. The printing system being configured to perform: controlling the printing member to perform printing based on a print job for which a charged fee is already settled; receiving a first instruction to suspend the printing started by the printing member; suspending the printing started by the printing member in response to reception of the first instruction; receiving a second instruction as to a post suspending process to be executed after the printing is suspended; and one of a post fee-settlement process and a restart process, as the post suspending process, the post fee-settlement process being related to provision of a benefit corresponding to refunding at least part of the charged fee, the restart process being to restart the suspended printing to complete the print job after a reason that the first instruction is made is resolved.

According to another aspect, the disclosure provides a printing device. The printing device includes a printing member and a processor. The printing member is configured to perform printing. The processor is configured to perform: controlling the printing member to perform printing based on a print job for which a charged fee is already settled; receiving a first instruction to suspend the printing started by the printing member; suspending the printing started by the printing member in response to reception of the first instruction; receiving a second instruction as to a post suspending process to be executed after the printing is suspended; and one of a post fee-settlement process and a restart process, as the post suspending process, the post fee-settlement process being related to provision of a benefit corresponding to refunding at least part of the charged fee, the restart process being to restart the suspended printing to complete the print job after a reason that the first instruction is made is resolved.

According to another aspect, the disclosure provides a method. The method includes: controlling a printing member to perform printing based on a print job for which a charged fee is already settled; receiving a first instruction to suspend the printing started by the printing member; suspending the printing started by the printing member in response to reception of the first instruction; receiving a second instruction as to a post suspending process to be executed after the printing is suspended; and performing one of a post fee-settlement process and a restart process, as the post suspending process, the post fee-settlement process being related to provision of a benefit corresponding to refunding at least part of the charged fee, the restart process being to restart the suspended printing to complete the print job after a reason that the first instruction is made is resolved.

According to another aspect, the disclosure provides a non-transitory computer readable storage medium storing a set of program instructions installed on and executed by a computer in a printing device. The printing device further includes a printing member configured to perform printing. The set of program instructions includes: controlling the printing member to perform printing based on a print job for which a charged fee is already settled; receiving a first instruction to suspend the printing started by the printing member; suspending the printing started by the printing member in response to reception of the first instruction; receiving a second instruction as to a post suspending process to be executed after the printing is suspended; and performing one of a post fee-settlement process and a restart process, as the post suspending process, the post fee-settlement process being related to provision of a benefit corresponding to refunding at least part of the charged fee, the restart process being to restart the suspended printing to complete the print job after a reason that the first instruction is made is resolved.

With the above structures, one of the post fee settlement process and the restart process is selectively executed after the user makes the instruction to suspend printing, rather than simply issuing a refund every time printing is suspended, as in the conventional method. Thus, depending on the reason that led the user to suspend printing, printing is restarted after the issue has been resolved, without issuing a refund or the like, thereby completing the print job. Accordingly, the user convenience can be improved.

FIG. 12 is a sequence diagram showing a sequence flow continuing from the flow shown in FIG. 11.

FIG. 1 shows a printing system according to one embodiment of the present disclosure. In the present embodiment, a printing system 1 provides a copy service to users, i.e., customers who pay a fee to use the copy function of a multifunction peripheral 200.

Overview of the Printing System

Figure 1:
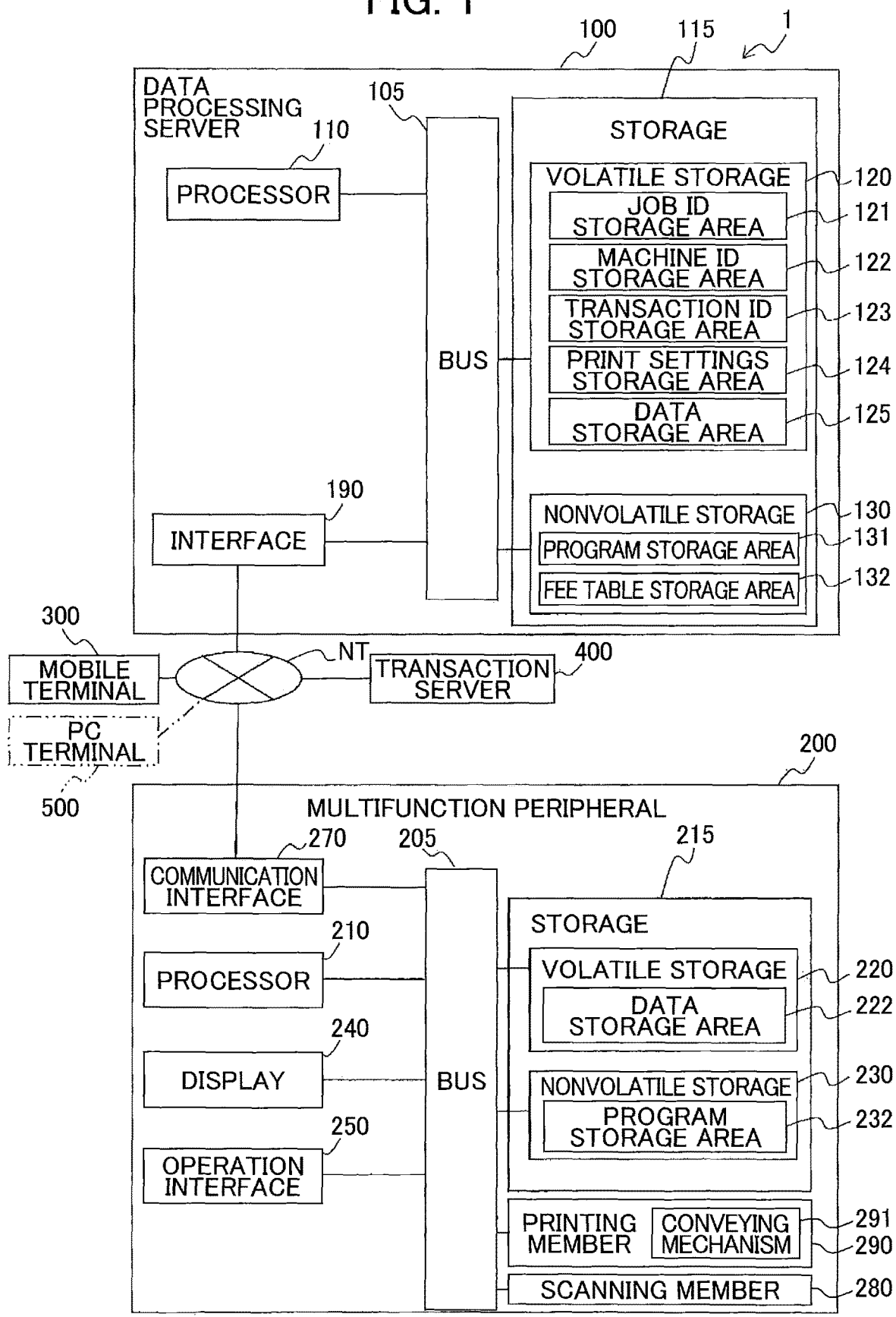
FIG. 1 is a block diagram illustrating an overall structure of a printing system according to an embodiment.

The printing system 1 in FIG. 1 includes a data processing server 100, a multifunction peripheral 200, a mobile terminal 300, and a transaction server 400. The data processing server 100, the multifunction peripheral 200, the mobile terminal 300, and the transaction server 400 are interconnected over a network NT and are capable of communicating with each other. A PC terminal 500 shown in FIG. 1 will be described later.

Data Processing Server

The data processing server 100 is installed and managed by the manufacturer of the multifunction peripheral 200, for example. The data processing server 100 has a processor 110, a storage 115, and an interface 190. The processor 110, the storage 115, and the interface 190 are interconnected via a bus 105.

The storage 115 is provided with a volatile storage 120, and a nonvolatile storage 130. The volatile storage 120 is DRAM, for example, and has a job ID storage area 121, a machine ID storage area 122, a transaction ID storage area 123, a print settings storage area 124, and a data storage area 125. The nonvolatile storage 130 is a hard disk drive or a solid state drive, for example. The nonvolatile storage 130 has a program storage area 131, and a fee table storage area 132. The details of these storages will be described later in detail.

The processor 110 is a device that performs data processing, such as a CPU. By executing a program stored in the program storage area 131, the processor 110 implements various processes, such as those in FIGS. 2, 3, 4, 6, 7, 9, and the like described later, including processes for performing data communications with the mobile terminal 300, the multifunction peripheral 200, and the transaction server 400 connected to the network NT.

The interface 190 is a wired LAN interface or a wireless interface for communicating with other devices. The interface 190 is connected to the network NT.

Transaction Server

The transaction server 400 is installed at a company providing various online services for settling online payments, for example. Although not shown in the drawings, the transaction server 400 has a processor, a storage, and an interface for connecting to the network NT.

Multifunction Peripheral

The multifunction peripheral 200 is owned by the company providing the copy (or print) service described above, for example. The multifunction peripheral 200 has a scanning member 280, a printing member 290, a processor 210, a storage 215, a display 240, a user-operable operation interface 250, and a communication interface 270. The scanning member 280, the printing member 290, the processor 210, the storage 215, the display 240, the operation interface 250, and the communication interface 270 are interconnected via a bus 205.

The storage 215 includes a volatile storage 220, and a nonvolatile storage 230. The volatile storage 220 is DRAM, for example. The volatile storage 220 is provided with a data storage area 222 for storing scan data. The nonvolatile storage 230 is flash memory, for example. The nonvolatile storage 230 is provided with a program storage area 232. The program storage area 232 stores various programs including a program printing program related to sequence diagrams shown in FIGS. 2-4, 6, 7, and 9. The printing program is pre-stored as firmware, for example in the nonvolatile storage 230.

The processor 210 is a device such as a CPU that performs data processing. By executing the printing program stored in the program storage area 232, the processor 210 performs a printing method of the printing system 1 together with the processor 110. Accordingly, the processor 210 implements a copy function (described later in greater detail) for controlling the printing member 290 to print images based on scan data generated when the scanning member 280 reads an original.

The display 240 is a liquid crystal display, for example. The operation interface 250 is a device that receives user operations. By operating the operation interface 250, the user can input various instructions into the multifunction peripheral 200. The communication interface 270 is a wired or wireless network interface for communicating with other devices. The communication interface 270 is connected to the network NT.

The scanning member 280 optically reads a document or other scanning target using photoelectric conversion elements, such as a CCD or CMOS, and generates scan data representing an image of the scanning target. Note that the scan data may simply be the image data produced when the scanning member 280 reads the scanning target or may be data produced by subjecting this image data to image processing or converting the image data to print data.

The printing member 290 has a conveying mechanism 291 for picking up and conveying sheets of paper from a sheet-feeding tray. The printing member 290 prints images on the conveyed sheets according to a prescribed method. The following specification describes a case in which printing is performed according to the inkjet method. The sheet is an example of a printing medium.

Mobile Terminal

The mobile terminal 300 is a smartphone possessed by the user in this example. The mobile terminal 300 connects to the network NT through wireless communication. While not shown in the drawings, the mobile terminal 300 has a processor, a storage, and an interface for connecting to the network NT. As an alternative, another information terminal, such as a personal computer or a tablet computer, may be used as the mobile terminal 300.

Features of the Embodiment

A feature of the present embodiment is the processing performed on the printing system 1 having the above configuration when the user performs an operation to suspend printing after the multifunction peripheral 200 has read a document and started printing the corresponding image data in response to a user operation and before printing is completed. This feature will be described at length below.

Process Flow

Control procedures indicating processes executed by the processor 210 of the multifunction peripheral 200, the processor 110 of the data processing server 100, the processor of the transaction server 400, and the processor of the mobile terminal 300 will be described with reference to FIGS. 2 through 9 in the present embodiment. Note that references to these processors have been omitted in the following description of FIGS. 2 through 9. That is, expressions such as "the processor of the multifunction peripheral 200" and "by the processor of the multifunction peripheral 200" are simply expressed as "the multifunction peripheral 200" and "by the multifunction peripheral 200."

Accepting and Sending/Receiving Print Settings

Figure 2:
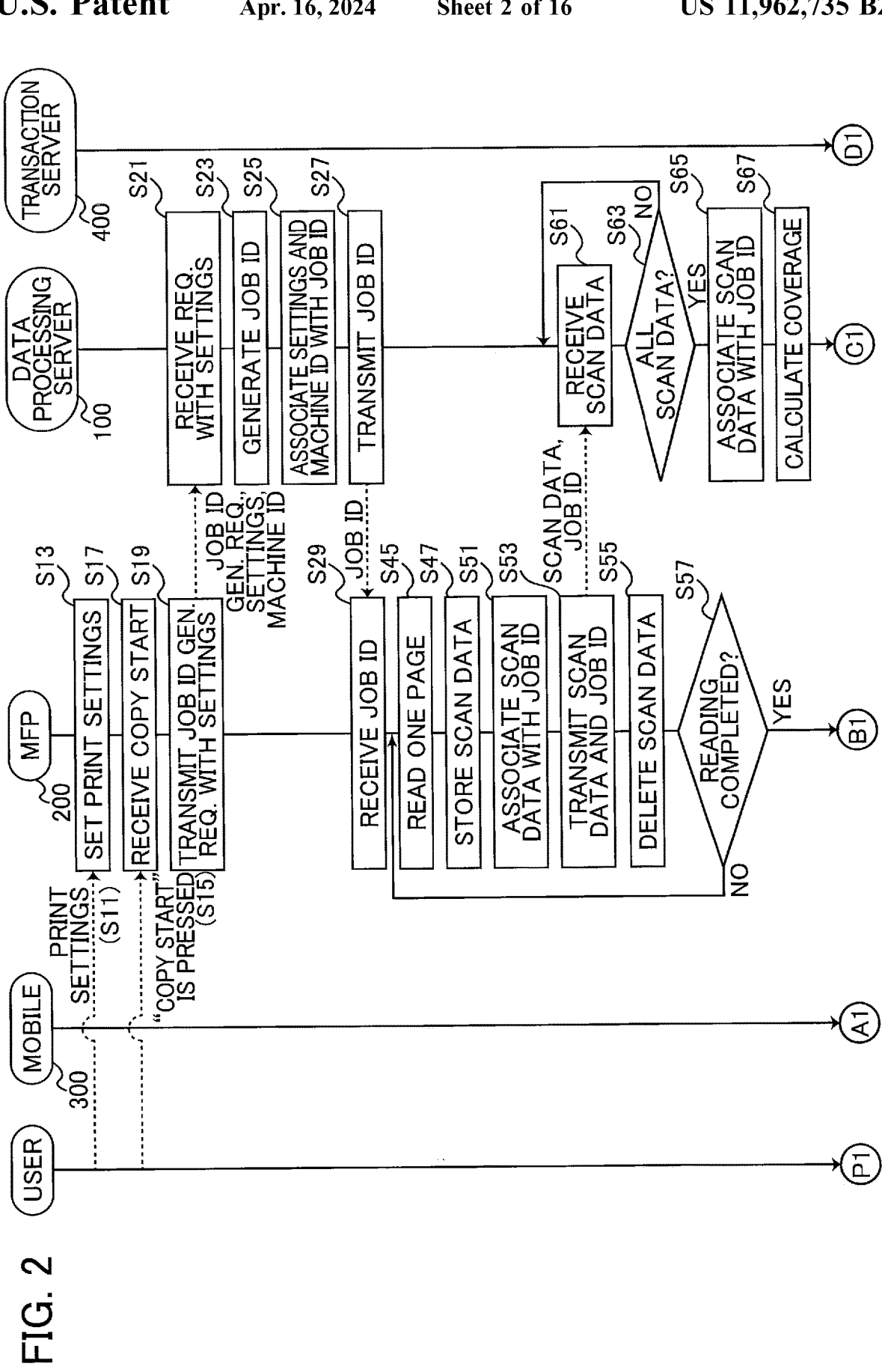
FIG. 2 is a sequence diagram illustrating a sequence flow executed by a mobile terminal, a multifunction peripheral, a data processing server, and a transaction server.

After setting the original document in the multifunction peripheral 200, in S11 of FIG. 2 the user inputs desired print settings through operations on the operation interface 250. These print settings include a setting for the size of paper to be printed, i.e., a specification for the sheet-feeding tray described above; a color setting designating either full color printing or monochrome printing; a print density setting when printing a scanned image of the read original; and a setting for the number of copies to be printed. The print settings may also include a setting of the reading resolution or printing resolution, a print layout setting indicating whether to print the same image a plurality of times on one page, and a selection for single-sided or double-sided printing.

In S13 the multifunction peripheral 200 accepts input for these print settings and configures the print settings based on the received content. When the user subsequently issues a command in S15 to begin copying by pressing the "Copy Start" button on the operation interface 250, in S17 the multifunction peripheral 200 receives this command.

In response to receiving the print settings in S13 and the command to begin copying in S17, in S19 the multifunction peripheral 200 transmits a job ID generation request and the print settings to the data processing server 100. A job ID is information for identifying the scan data, i.e., information for identifying the current copy job to be executed by the multifunction peripheral 200. The job ID generation request is a request for the data processing server 100 to generate and transmit the job ID. Note that the multifunction peripheral 200 also includes a machine ID for identifying itself when transmitting the job ID generation request and the print settings. The machine ID is an example of identification information for the multifunction peripheral 200.

In S21 the data processing server 100 receives the job ID generation request and the print settings together with the machine ID and in S23 generates a new job ID based on the received information. The data processing server 100 associates the new job ID with the machine ID and print settings received in S21. As a result, in S25 the print settings, the job ID, and the machine ID are stored and registered in the respective print settings storage area 124, job ID storage area 121, and machine ID storage area 122 of the volatile storage 120 in an associated state. Subsequently, in S27 the data processing server 100 transmits the newly registered job ID to the multifunction peripheral 200 and in S29 the multifunction peripheral 200 receives this job ID.

Document Reading and Coverage Calculation

After completing the process in S29 described above, in S45 the multifunction peripheral 200 reads one page of the original which is set in the multifunction peripheral 200. In S47 the multifunction peripheral 200 saves the scan data for the read page in the scan data storage area 222 of the volatile storage 220.

In S51 the multifunction peripheral 200 associates the job ID received in S29 with the scan data that was saved in the data storage area 222 in S47, and subsequently in S53 transmits the scan data and the job ID to the data processing server 100. In S55 the multifunction peripheral 200 deletes the scan data from the data storage area 222. In the subsequent process of S57, the multifunction peripheral 200 determines whether the reading process has been completed for all pages the user wishes to copy and repeats steps S45 through S55 when determining that the reading process is not completed (S57: NO). When the reading process has been completed for all pages that the user wishes to copy (S57: YES), the process advances to S87 described below.

In the meantime, after completing the process of S27 described above, the data processing server 100 proceeds to S61. In S61 the data processing server 100 receives the scan data and the job ID transmitted from the multifunction peripheral 200 in S53 described above. In S63 the data processing server 100 determines whether all scan data has been received and continues to receive data in S61 while not all scan data has been received (S63: NO). Once all scan data has been received (S63: YES), in S65 the data processing server 100 stores all the scan data received in S61 in the data storage area 125 in association with the job ID generated in S23. In S67 the data processing server 100 calculates the coverage of the scan data and subsequently advances to S77 described below.

Fee Calculation and Payment

Figure 3:
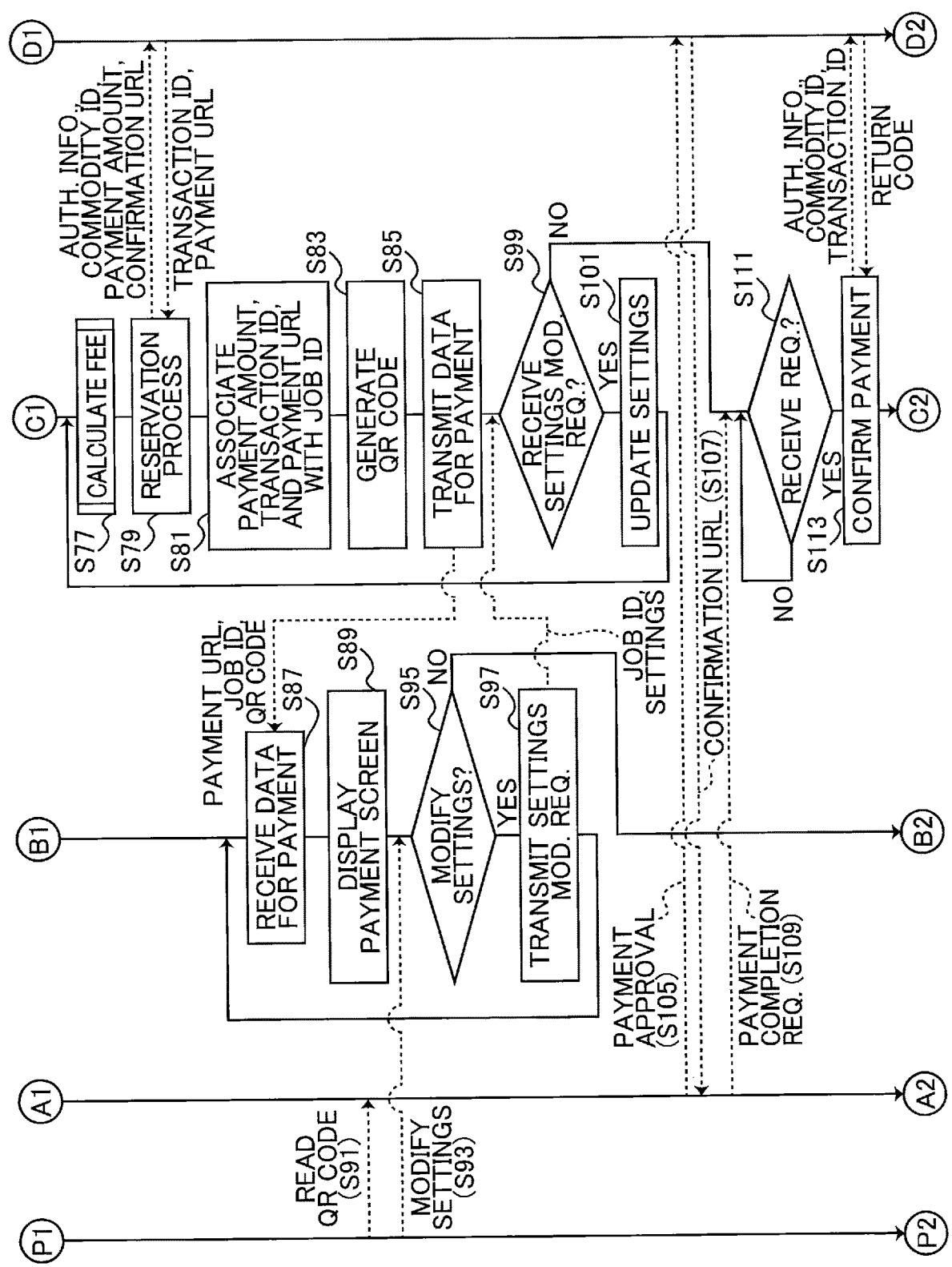
FIG. 3 is a sequence diagram showing a sequence flow continuing from the flow shown in FIG. 2.

Next, in S77 shown in FIG. 3, the data processing server 100 calculates a fee to be charged to the user for using the copy service for the current job, i.e., for reading the above original and printing the corresponding scan data, based on the coverage value calculated in S67 described above. The calculated fee is an example of the first fee. To calculate this fee, the data processing server 100 uses a prescribed fee table stored in the fee table storage area 132 of the volatile storage 120 described above, for example. The fee table correlates various coverages with their corresponding fees. In addition to the level of coverage, the data processing server 100 also considers the print settings described above when calculating the fee. The processor 110 executing the process of S77 is an example of the fee determining portion.

Thereafter, in S79 the data processing server 100 performs a payment reservation process. Specifically, the data processing server 100 transmits a commodity ID appropriately issued for the execution of the current copy service, a payment amount obtained through the calculation in S77, authentication information to be used for authentication on the transaction server 400, and a confirmation URL for confirming the completion of payment (the URL of the data processing server 100 in the present embodiment) to the transaction server 400. In response to this transmission, the data processing server 100 also receives a payment URL that the user accesses to pay the fee, and a transaction ID related to the fee payment procedure from the transaction server 400. The transaction ID is an example of first transaction identification information.

Next, in S81 the data processing server 100 associates the payment amount resulting from the calculation in S77 and the transaction ID and payment URL acquired in S79 with the job ID described above. The processes of S79 and S81 are an example of the first payment related process, and the function of the processor 110 executing the processes of S79 and S81 is an example of the payment related processing portion. In S83 the data processing server 100 generates a barcode, such as a QR code, corresponding to the payment URL according to a suitable method known in the art, and in S85 transmits data required for making a payment, including the QR code, to the multifunction peripheral 200. "QR code" is a registered Japanese trademark of DENSO WAVE INCORPORATED.

In addition to the QR code, the data necessary for making a payment includes the payment URL and the job ID described above. The multifunction peripheral 200 receives this data in S87. After receiving this data, in S89 the multifunction peripheral 200 displays a prescribed payment screen (not shown) on the display 240 showing the above data required for payment that includes at least the QR code. Instead of outputting this data required for payment to a display, the multifunction peripheral 200 may instead print out the data on paper using the printing member 290. In S91 the user reads the QR code displayed in the payment screen with a scanner or camera provided in the mobile terminal 300, whereby a screen (not shown) with the payment URL is displayed on the mobile terminal 300. By accessing the payment URL displayed in this screen, the user can display a fee display screen that includes the fee calculated above and the like. Through this display, the user can learn the fee that the user must pay to use the copy service for this case.

Thereafter, in S95 the multifunction peripheral 200 determines whether the user has inputted instructions to modify print settings. That is, in a case that the user, after seeing the fee displayed on the display 240 in S89 described above, decides to reconsider the charges, for example, in S93 the user performs appropriate operations on the operation interface 250 to input instructions for modifying the print settings. The multifunction peripheral 200 receives these modified settings and, as a result, advances to S97 after determining in S95 that settings are to be changed (S95: YES).

In S97 the multifunction peripheral 200 transmits a print settings modification request specifying the content of print settings changed by the user to the data processing server 100 together with the job ID, and the data processing server 100 receives this request. Thus, in S99 the data processing server 100 determines that a print settings modification request was received (S99: YES) and advances to S101. In S101 the data processing server 100 modifies the current print settings based on the content in the request received from the multifunction peripheral 200 and updates the stored settings. In this case, the data processing server 100 returns to S77. Subsequently, based on the updated content of print settings, in S77 the data processing server 100 recalculates the fee for the scan data saved in the data storage area 125 that corresponds to the received job ID. Consequently, the processes in S79, S81, S83, and S85 described above are repeated for the recalculated fee. In S87 the multifunction peripheral 200 receives the QR code, payment URL, and job ID from the data processing server 100 and in S89 redisplays the payment screen. Thus, the user can learn the recalculated fee in the same manner described above.

On the other hand, in a case that the user does not feel the need to review the fee and does not input instructions to modify print settings but rather accepts the charges for the current content (S95: NO), the multifunction peripheral 200 advances to S125 described later. Further, in a case that the user does not input instructions to modify print settings so that a request to modify print settings is not transmitted to the data processing server 100 (S99: NO), the data processing server 100 advances to S111 described later. To accept the settings at the displayed fee, the user performs a suitable operation in the fee display screen displayed on the mobile terminal 300, and in response to this operation, in S105 the mobile terminal 300 transmits to the transaction server 400 a payment approval notification indicating that the user agrees to pay the fee for the current copy service.

After receiving the approval notification, in S107 the transaction server 400 transmits the confirmation URL to the mobile terminal 300 that corresponds to the payment URL sent to the data processing server 100 in S79 during payment reservation. Based on this confirmation URL, in S109 the mobile terminal 300 transmits a payment completion request to the data processing server 100, and the data processing server 100 receives this request. In the meantime, in S111 the data processing server 100 determines whether the payment completion request has been received in S111. The processing server 100 repeatedly performs the determination of S111 while a payment completion request has not been received (S111: NO). When the data processing server 100 determines that the payment completion request was received (S111: YES), in S113 the data processing server 100 performs a process to confirm payment completion. Specifically, the data processing server 100 transmits the authentication information, commodity ID, and transaction ID corresponding to the confirmation URL to the transaction server 400. Subsequently, the data processing server 100 receives a return code from the transaction server 400 in response.

Printing Scan Data

Figure 4:
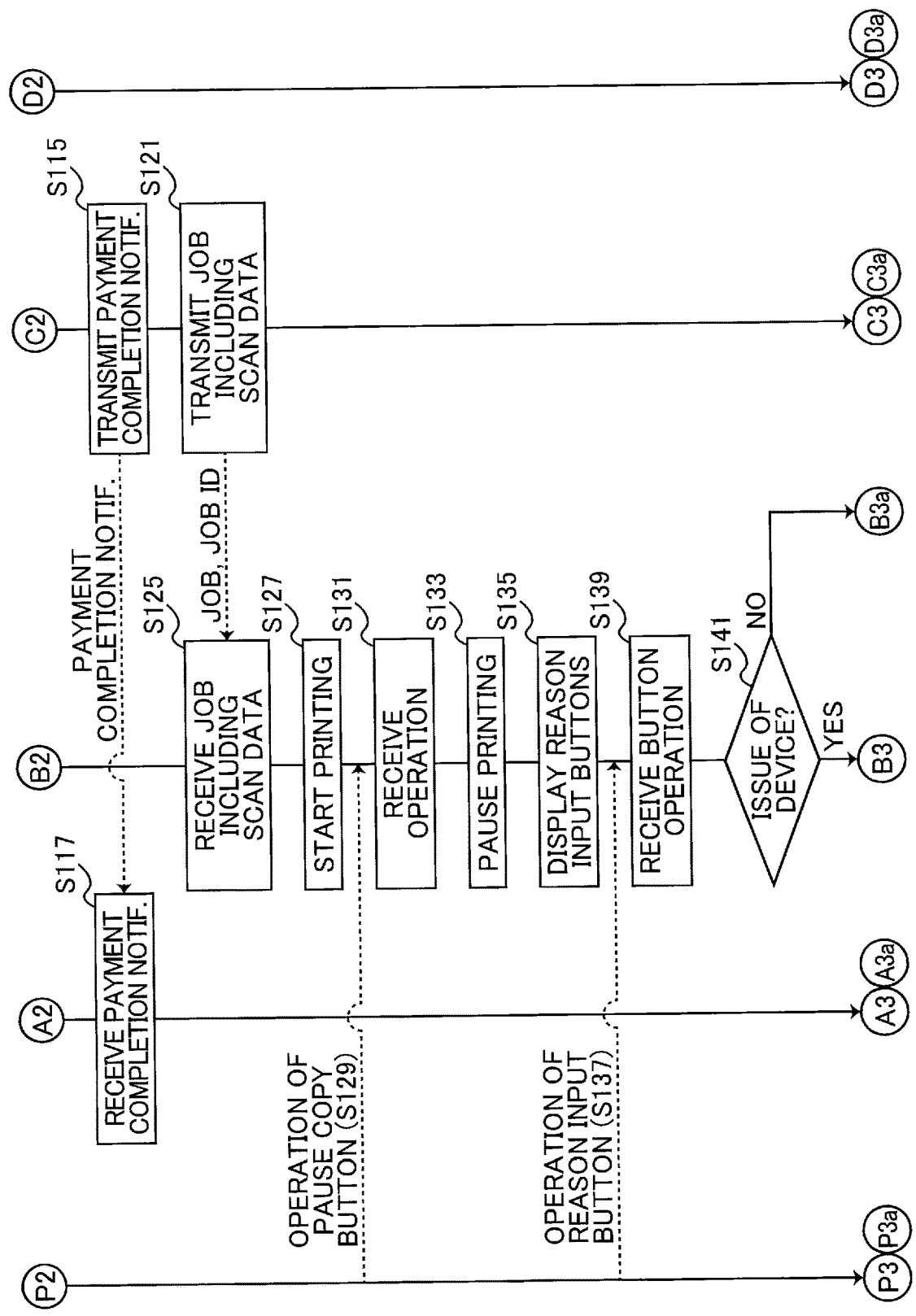
FIG. 4 is a sequence diagram showing a sequence flow continuing from the flow shown in FIG. 3.

After the process in S113 described above for confirming the completion of payment, in S115 of FIG. 4 the data processing server 100 transmits a payment completion notification to the mobile terminal 300 together with the job ID described above, and in S117 the mobile terminal 300 receives this information. In S121 the data processing server 100 transmits a print job that includes the scan data stored in the data storage area 125 to the multifunction peripheral 200 together with the corresponding job ID. In S125 the multifunction peripheral 200 acquires the print job and the job ID transmitted in S121.

Note that other methods may be used in place of the method described in steps S121 and S125 for transmitting scan data directly from the data processing server 100 to the multifunction peripheral 200. For example, in response to receiving a notification from the transaction server 400 confirming the completion of payment, the data processing server 100 may store the scan data saved in the data storage area 125 in a suitable external device connected to the network NT. In this case, the data processing server 100 subsequently transmits a data acquisition instruction to the multifunction peripheral 200. Upon receiving the data acquisition instruction from the data processing server 100, the multifunction peripheral 200 accesses the external device through the network NT and acquires the scan data from the external device.

In S127 the multifunction peripheral 200 controls the printing member 290 to begin printing the print job received in S125 on paper based on the print settings set at the current time. As described above, payment has already been settled for this print job. The process of S127 is an example of the printing step.

Process Performed when Printing is Interrupted

Figure 5A:
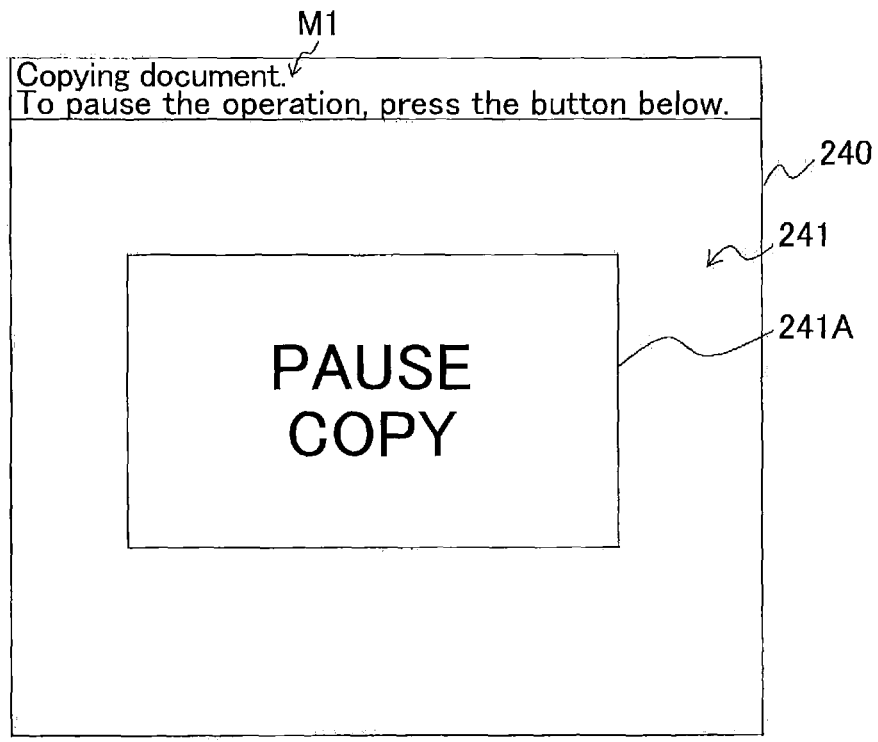
FIG. 5A is an explanatory diagram illustrating a pause operation screen.

In the present embodiment, a printing operation begun in S127 can be stopped through a user operation before the printing operation is completed, as described above. That is, a pause operation screen 241, such as that shown in FIG. 5A, is displayed on the display 240 while printing is being executed. The pause operation screen 241 displayed on the display 240 includes a message M1, and a "Pause Copy" button 241A. The message M1 is "Copying document. To pause the operation, press the button below." The "Pause Copy" button 241A is an example of the first instruction input portion.

Returning to FIG. 4, in a case that in S129 the user performs a suitable operation on the operation interface 250 to select the "Pause Copy" button 241A while the "Pause Copy" button 241A is displayed on the display 240, in S131 the multifunction peripheral 200 receives this operation and in S133 temporarily suspends or halts printing by the printing member 290 that was started in S127. Hereinafter, the expression "an operation is performed via the operation interface 250" for a button displayed on the display 240, as described above, may be simplified to "the button is operated" or "the button is pressed" on the display 240 as appropriate. The process of S131 is an example of the first instruction input step. The process of S133 is an example of the pausing operation step. The function of the processor 210 executing the process of S133 is an example of the suspending control portion.

Figure 5B:
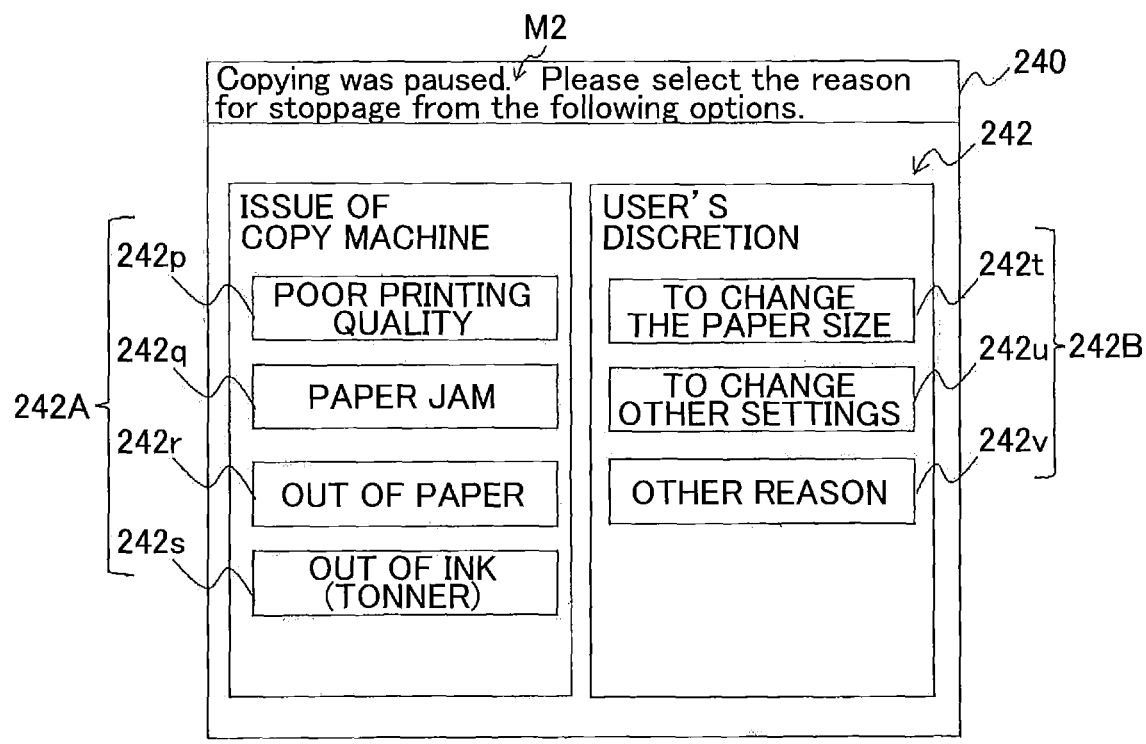
FIG. 5B is an explanatory diagram illustrating a reason input screen.

At the same time the multifunction peripheral 200 pauses printing, in S135 the multifunction peripheral 200 displays a reason input screen 242 including various reason input buttons 242p-242v described later on the display 240. As shown in FIG. 5B, the reason input screen 242 includes a message M2, and buttons for specifying the reason for stoppage. The message M2 is "Copying was paused. Please select the reason for stoppage from the following options." The buttons are divided between a device-related section 242A, and a user-related section 242B.

The device-related section 242A is a section to provide options to specify the reason related to inconvenience or issue about the device. Specifically, the device-related section 242A includes a "Poor printing quality" button 242p, a "Paper jam" button 242q, an "Out of paper" button 242r, and an "Out of ink" button 242s. The user operates the "Poor printing quality" button 242p when dissatisfied with the appearance of the printed image due to the presence of printing defects or the like. The user operates the "Paper jam" button 242q when printing was not performed properly due to a paper jam or the like occurring as the paper was conveyed within the multifunction peripheral 200. The printing defects is an example of poor printing and the paper jam of the conveying mechanism 291 is an example of the conveyance abnormality. In addition to these buttons for printing defects and conveyance abnormalities, similar buttons may be provided for other malfunctions related to the multifunction peripheral 200.

The user selects the "Out of paper" button 242r when the multifunction peripheral 200 has run out of paper. The user selects the "Out of ink" button 242s when the printed images are faint or the colors are pale due to the multifunction peripheral 200 running out of ink. When the multifunction peripheral 200 uses the laser method rather than the inkjet method, as will be described later, the "Out of ink" button 242s may be replaced with an "Out of toner" button. The ink and the toner are examples of the consumable. Hereinafter, these buttons will be simplified to "button 242p," "button 242q," "button 242r," and "button 242s." The buttons 242p-242s are examples of the first pausing input portion.

The user-related section 242B provides various options to specify the reason related to user's discretion, convenience, or wish. Specifically, the user-related section 242B includes a "To change the paper size" button 242t, a "To change other settings" button 242u, and a "Other reason" button 242v.

The user operates the "To change the paper size" button 242t when the size of paper currently being printed differs from the intended paper size due to an incorrect setting or incorrect user input, for example. The user operates the "To change other settings" button 242u when the current print settings described above differ from the intended settings due to incorrect settings or incorrect user input, for example.

Hereinafter, these buttons will be simplified to "button 242t," "button 242u," and "button 242v." The buttons 242t-242v are examples of the second pausing input portion.

In the following description, the buttons 242p, 242q, 242r, 242s, 242t, 242u, and 242v will be collectively referred to as the "reason input buttons." The reason input buttons 242p-242v are examples of the second instruction input portion.

Returning to FIG. 4, when the user operates one of the reason input buttons 242p-242v in S137, in S139 the multifunction peripheral 200 receives this operation. The process of S139 is an example of the second instruction input step. In S141 the multifunction peripheral 200 then determines whether the button operation received in S139 is one of the buttons 242p-242s signifying an issue with the multifunction peripheral 200. When one of the buttons 242p-242s was operated (S141: YES), the process advances to S143 in FIG. 6.

Stoppage Due to an Issue with the Multifunction Peripheral

Figure 6:
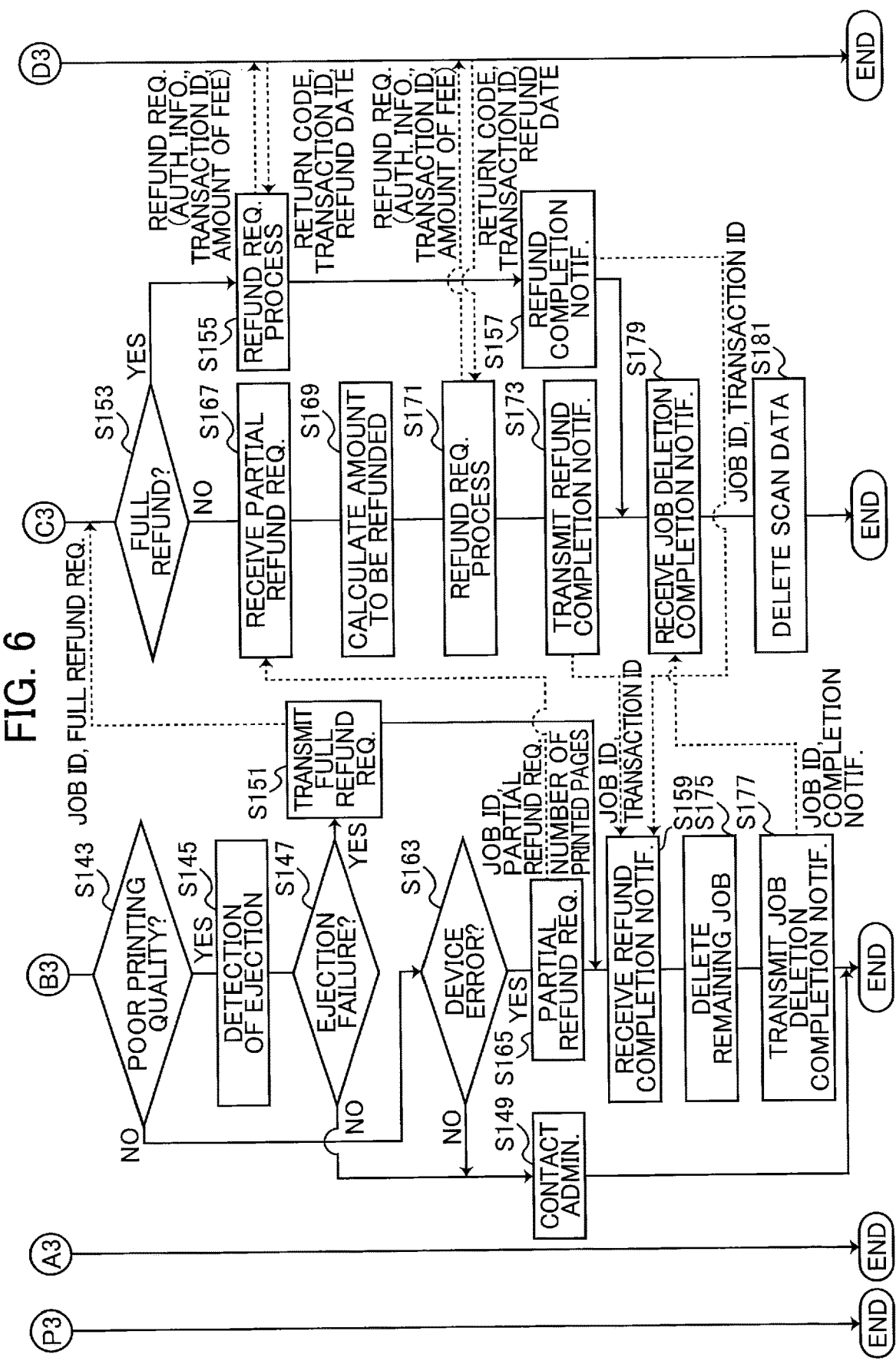
FIG. 6 is a sequence diagram showing a sequence flow continuing from the flow shown in FIG. 4.
Figure 7:
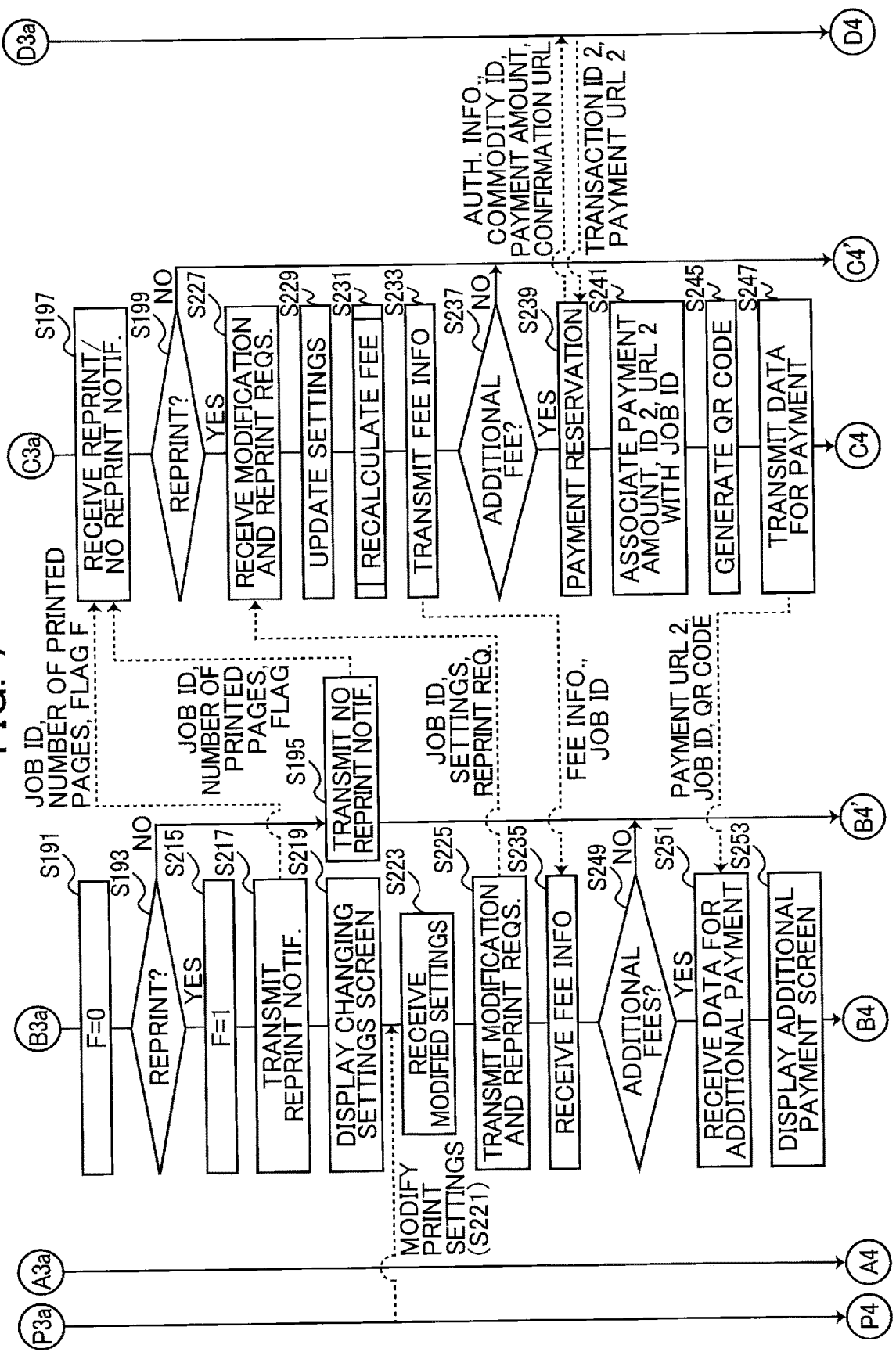
FIG. 7 is a sequence diagram showing a sequence flow continuing from the flow shown in FIG. 4.

In S143 of FIG. 6 the multifunction peripheral 200 determines whether the operated button was the "Poor printing quality" button 242p owing to a defect in the printed image. When the button 242p was operated (S143: YES), in S145 the multifunction peripheral 200 executes a process according to a well-known method for detecting ejection quality from nozzles in the inkjet head provided in the inkjet multifunction peripheral 200. For example, the multifunction peripheral 200 can detect when ejection is good or defective based on signals representing changes in electric current that occur when a charged ink droplet ejected from a nozzle in the inkjet head impacts an absorbent material. When the signal value is less than or equal to a prescribed threshold, for example, the multifunction peripheral 200 can determine that the quantity of ink ejected from the nozzle is less than a prescribed quantity or that the nozzle does not eject ink due to clogging of the nozzle or the like. In other words, the multifunction peripheral 200 can detect an ejection failure in the nozzle in question.

When no such ejection failures have occurred (S147: NO), then the reason for the poor image quality described above is unknown. Therefore, in S149 the multifunction peripheral 200 contacts an appropriate administrator belonging to or entrusted by the company described above, the administrator takes steps to resolve the issue, and the process of FIG. 6 ends. However, when an ejection failure has occurred (S147: YES), the multifunction peripheral 200 advances to S151.

In the event of an ejection failure, in S151 the multifunction peripheral 200 transmits to the data processing server 100 a request to issue a full refund to the user of charges confirmed to have been paid in S113 (FIG. 2) described above, together with the corresponding job ID. In S153 the data processing server 100 determines that the request for the full refund was received (S153: YES) and advances to S155.

In S155 the data processing server 100 performs a refund request process. Specifically, the data processing server 100 transmits, as a refund request, the authentication information described above for the transaction server 400, the transaction ID pertaining to the suspended print job, and the full amount of the fee calculated in S77 (FIG. 3), i.e., the amount to be refunded, to the transaction server 400. In response, the data processing server 100 receives a return code, a new transaction ID for the refund procedure, and a refund date on which the refund is scheduled to be completed from the transaction server 400.

Subsequently, in S157 the data processing server 100 transmits a refund completion notification to the multifunction peripheral 200, together with the transaction ID acquired in S155 and the corresponding job ID. The multifunction peripheral 200 receives this refund completion notification from the data processing server 100 in S159.

On the other hand, when the multifunction peripheral 200 determines in S143 that the button operation received in S139 is one of the "Paper jam" button 242q, "Out of paper" button 242r, and "Out of ink" button 242s (S143: NO), in S163 the multifunction peripheral 200 determines whether a paper jam, out-of-paper, or out-of-ink error corresponding to the buttons 242q, 242r, and 242s was detected in the multifunction peripheral 200. Hereinafter, these three events will simply be called "device error" when appropriate. The term "device error" will also be reflected in FIG. 6 and other drawings. The function executed by the processor 210 is an example of the determination portion.

The occurrence of a paper jam may be determined according to the following method, for example. The multifunction peripheral 200 can determine that a paper jam occurred when detecting with encoders that conveying rollers in the conveying mechanism or the feeding roller for feeding sheets from the tray are not rotating, despite the motor for driving these conveying rollers and feeding roller rotating. Further, the multifunction peripheral 200 may determine that paper became jammed along the conveying path when a paper sensor provided along the path does not detect the passage of a sheet, despite the conveying rollers and feeding roller rotating. The multifunction peripheral 200 may also determine that a paper jam occurred when the carriage for moving the inkjet head in the scanning direction is not moving despite the motor for driving the carriage rotating, indicating that the carriage has become stuck on jammed paper.

When the multifunction peripheral 200 cannot detect a device error (S163: NO), the reason for the above device error is unknown. Accordingly, in S149 the multifunction peripheral 200 contacts the appropriate administrator, as described above, the administrator takes measures to resolve the problem, and the process of FIG. 6 ends. However, when the multifunction peripheral 200 detected the occurrence of a device error (S163: YES), the multifunction peripheral 200 advances to S165.

In the event of the device error, in S165 the multifunction peripheral 200 transmits a request to the data processing server 100 to issue a partial refund to the user for charges that were confirmed in S113 described above to have been paid, together with the corresponding job ID. Here, the multifunction peripheral 200 requests a partial refund rather than a full refund in this case since printing is considered to have been performed normally until just before the occurrence of the paper jam, out-of-paper, or out-of-ink error. Hence, when transmitting the request for a partial refund in S165, the multifunction peripheral 200 includes the corresponding job ID and the number of pages that were printed up until just before the error occurred.

When the multifunction peripheral 200 transmits the request for the partial refund, the data processing server 100 determines in S153 described above that the request for the full refund was not received (S153: NO), and subsequently receives the request for the partial refund in S167.

In S169 the data processing server 100 calculates the amount to be refunded to the user based on the number of printed pages received in S167 according to the similar method described above in S77. In S171 the data processing server 100 performs the same refund request process described in S155, transmitting, as a refund request, the authentication information for the transaction server 400, the transaction ID, and the amount calculated in S169, i.e., the amount to be refunded, to the transaction server 400. Similarly, the data processing server 100 receives a return code, a new transaction ID, and a refund date from the transaction server 400.

Subsequently, in S173 the data processing server 100 transmits a refund completion notification to the multifunction peripheral 200, together with the transaction ID acquired in S171 and the corresponding job ID, as in the process of S157 described above. In S159 the multifunction peripheral 200 receives the refund completion notification transmitted from the data processing server 100.

After receiving the refund completion notification in S159, in S175 the multifunction peripheral 200 deletes the remaining portion of the print job that was not executed prior to the print job being paused. In S177 the multifunction peripheral 200 transmits a job deletion completion notification indicating that the print job was deleted to the data processing server 100 together with the job ID, and the data processing server 100 receives this notification in S179. In S181 the data processing server 100 deletes the scan data stored in the data storage area 125 and ends the process of FIG. 6.

Stoppage at the User's Discretion

On the other hand, when the multifunction peripheral 200 determines in S141 of FIG. 4 described above that the button operation received in S139 is one of the buttons 242t-242v signifying that printing was stopped at the user's discretion (S141: NO), the multifunction peripheral 200 advances to S191 in FIG. 7.

In S191 the multifunction peripheral 200 initializes a flag F to 0. The flag F indicates whether or not to reprint the print job that was paused, as described above. Next, in S193 the multifunction peripheral 200 determines whether a reprint instruction was issued by the user. Specifically, when one of the buttons 242t-242v in the user-related section 242B shown in FIG. 5B was operated (S141: NO), the multifunction peripheral 200 displays a reprint confirmation screen 243 shown in FIG. 8 on the display 240. The reprint confirmation screen 243 includes a message M3, a "Reprint" button 243A, and a "Do not reprint" button 243B. The message M3 is "You have halted printing. Would you like to reprint the job?"

By operating the "Reprint" button 243A provided in this reprint confirmation screen 243, the user can restart the print job that was paused as described above. Thus, the multifunction peripheral 200 determines in S193 whether the user operated the "Reprint" button 243A.

When not Reprinting

When the "Do not reprint" button 243B was operated rather than the "Reprint" button 243A (S193: NO), in S195 the multifunction peripheral 200 generates a no reprint notification and transmits this notification to the data processing server 100. The no reprint notification is transmitted together with the job ID for the suspended print job, the number of pages printed prior to the pause, and the current value of the flag F. After receiving this no reprint notification in S197, the data processing server 100 determines in S199 that a reprint is not to be executed (S199: NO), and advances to S201 of FIG. 9.

Figure 9:
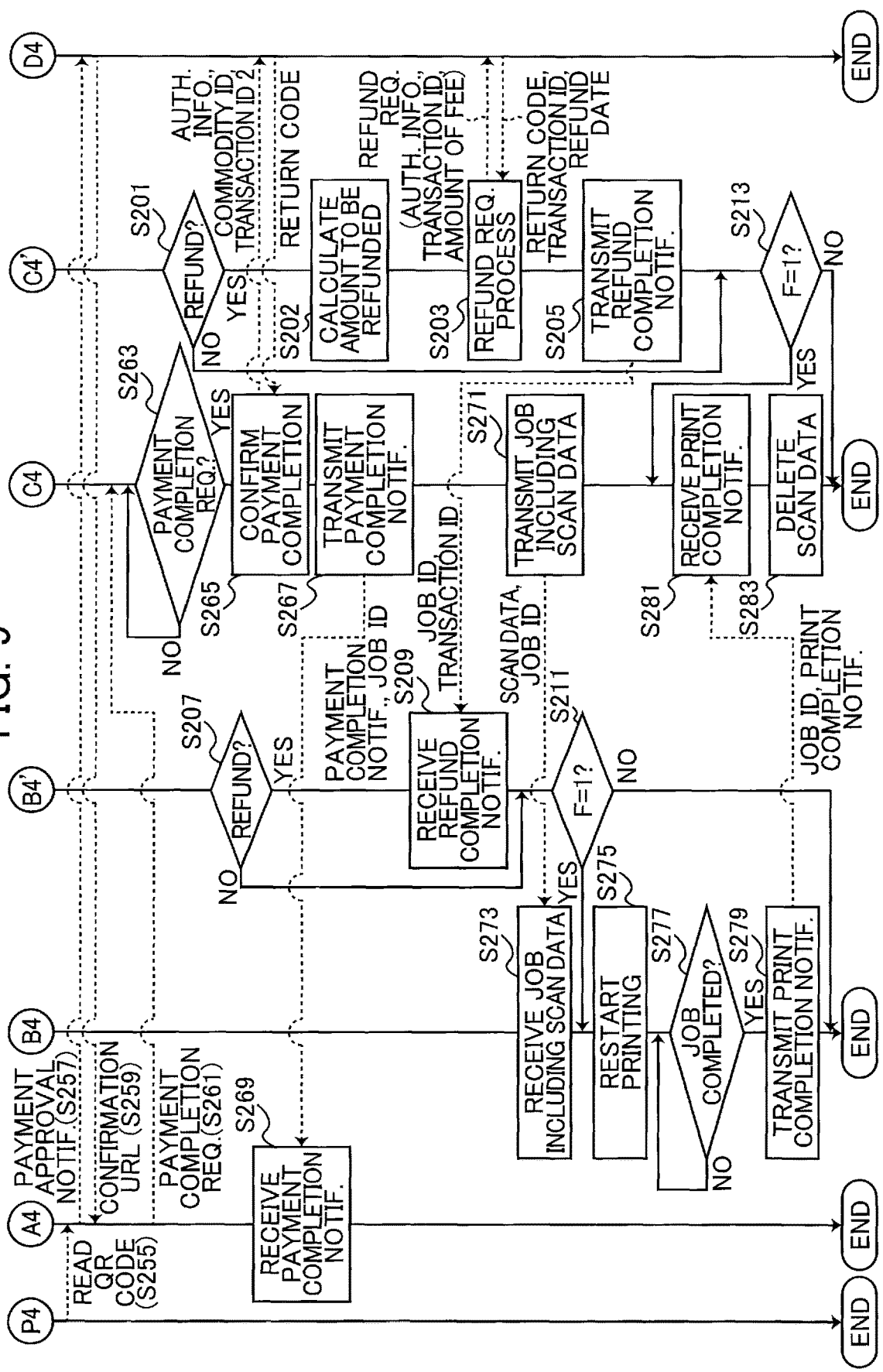
FIG. 9 is a sequence diagram showing a sequence flow continuing from the flow shown in FIG. 7.

In S201 of FIG. 9, the data processing server 100 determines whether the user is to receive a refund. When a print is canceled at the user's discretion in the present embodiment, charges are not refunded for printed pages, but charges for unprinted pages are refunded in the case of no reprint. Therefore, when the no reprint notification was received, the data processing server 100 determines that a refund is to be issued (S201: YES) and in S202 calculates the amount to be refunded to the user based on the number of printed pages received in S197, as in the process of S169 (FIG. 6) described above. In S203 the data processing server 100 performs the same refund request process described above in S171, transmitting the authentication information for the transaction server 400, the transaction ID, and the amount calculated in S202, i.e., the amount to be refunded, to the transaction server 400. In response, the data processing server 100 also receives a return code, a new transaction ID, and the refund date from the transaction server 400. In S205, as in S173 described above, the data processing server 100 transmits a refund completion notification to the multifunction peripheral 200, together with the transaction ID acquired in S203 and the corresponding job ID.

In the meantime, after transmitting the no reprint notification in S195 (FIG. 7), in S207 of FIG. 9 the multifunction peripheral 200 also determines that a refund is to be issued to the user (S207: YES) and in S209 receives the refund completion notification transmitted from the data processing server 100 in S205. Thereafter, in S211 the multifunction peripheral 200 determines whether the flag F is set to 1. Since the flag F remains 0 in this case (S211: NO), the multifunction peripheral 200 ends the process in FIG. 9.

After transmitting the notification in S205, the data processing server 100 similarly determines in S213 whether the flag F is set to 1. Since the flag F received in S197 (FIG. 7) is 0 at this time (S213: NO), the data processing server 100 ends the process in FIG. 9.

When Reprinting

Figure 8:
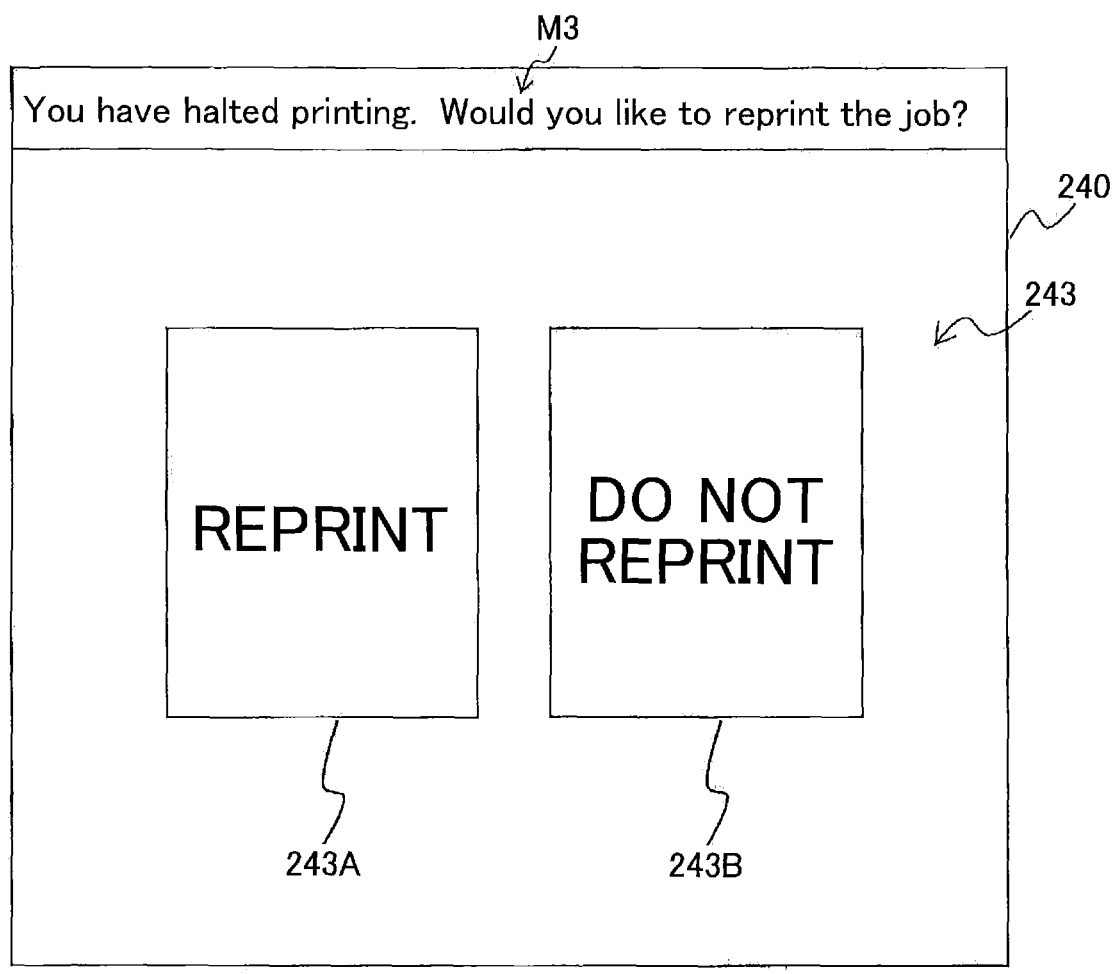
FIG. 8 is an explanatory diagram illustrating a reprint confirmation screen.

On the other hand, when the "Reprint" button 243A was operated in the reprint confirmation screen 243 shown in FIG. 8 (S193: YES), in S215 (FIG. 7) the multifunction peripheral 200 sets the flag F described above to 1 and in S217 generates a reprint notification and transmits this notification to the data processing server 100. When transmitting this reprint notification, the multifunction peripheral 200 includes the job ID for the suspended print job, the number of pages that were printed just prior to the print job being paused, and the current value of the flag F, as described above for the no reprint notification.

Figure 10:
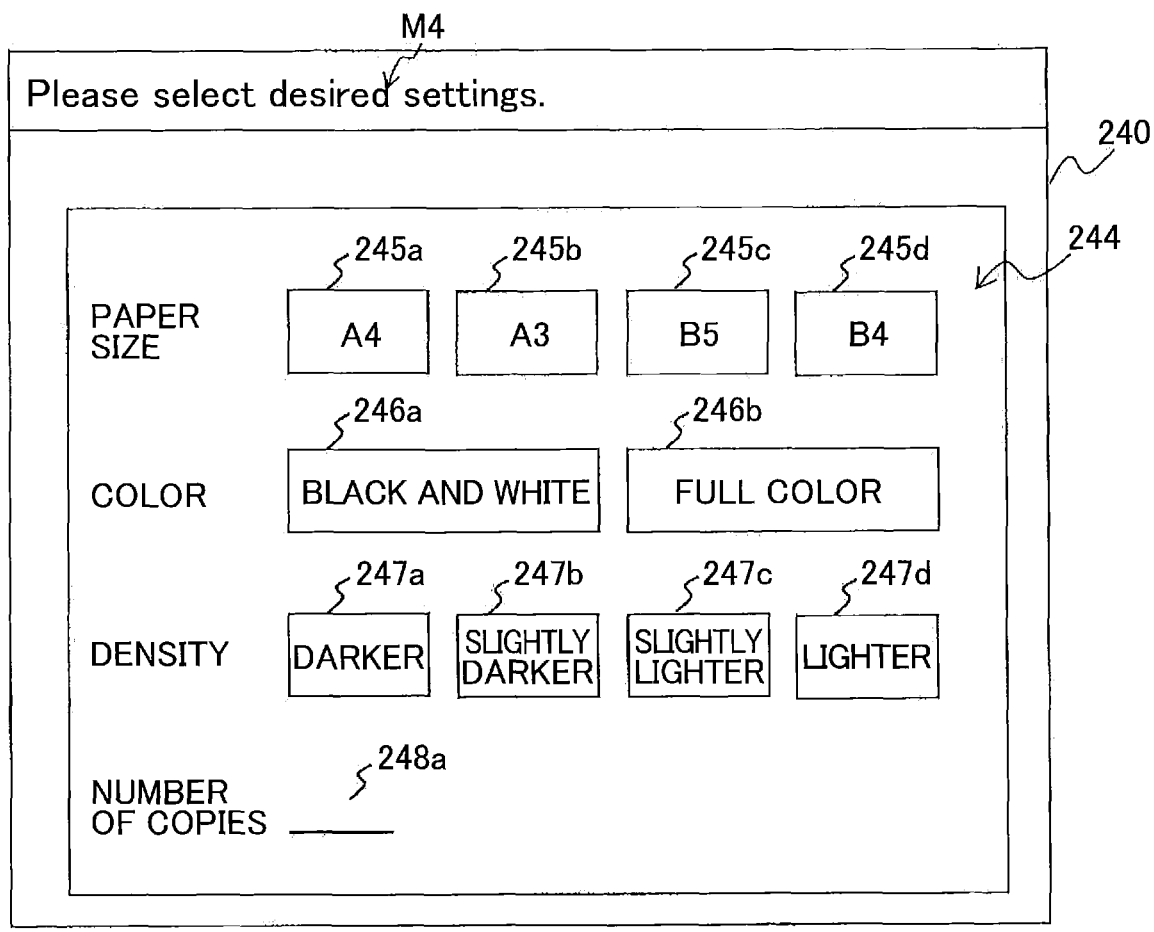
FIG. 10 is an explanatory diagram illustrating a print settings modification screen 244.

When performing a reprint in the present embodiment, the user can restart the print job after modifying print settings. After transmitting the notification in S217, in S219 the multifunction peripheral 200 displays a screen on the display 240 for changing and resetting the print settings. That is, when the user operates the "Reprint" button 243A in the reprint confirmation screen 243 shown in FIG. 8, the multifunction peripheral 200 displays a print settings modification screen 244 shown in FIG. 10 on the display 240. The print settings modification screen 244 includes a message M4, such as "Please select desired settings." buttons 245a-d related to paper size, buttons 246a and 246b for color options, buttons 247a-d related to printing density, and a copies field 248a for setting the number of copies to be printed. In this example, the user can set the paper size by selecting one of an "A4" button 245a, an "A3" button 245b, a "B5" button 245c, and a "B4" button 245d. The user can also set a color mode by selecting one of a "Black and White" button 246a and a "Full Color" button 246b. The user can also set the printing density by selecting from among a "Darker" button 247a, a "Slightly Darker" button 247b, a "Slightly Lighter" button 247c, and a "Lighter" button 247d. The user may also input a value in the copies field 248a to set a desired number of copies to be printed. The print settings modification screen 244 is an example of the operation input portion.

Returning to FIG. 7, when the user inputs desired instructions in the print settings modification screen 244 in S221 to modify print settings, in S223 the multifunction peripheral 200 receives these modified settings. In response, in S225 the multifunction peripheral 200 transmits a print settings modification request and a reprint request to the multifunction peripheral 200, together with the content of the user-modified print settings and the job ID.

In the meantime, in S197 the data processing server 100 receives a reprint notification, which is transmitted from the multifunction peripheral 200. In this case, the data processing server 100 has determined in S199 that the reprint notification is received in S217 (S199: YES), and thereafter in S227 the data processing server 100 receives the print settings modification request, the reprint request, the print settings, and the job ID transmitted from the multifunction peripheral 200 in S225. In S229 the data processing server 100 modifies and updates the current print settings based on the content of the modified print settings received from the multifunction peripheral 200. Based on the updated content for print settings, in S231 the data processing server 100 recalculates the fee for the scan data saved in the data storage area 125 that corresponds to the received job ID. The process of S231 is an example of the second fee determining process. In S233 the data processing server 100 transmits the fee information representing the recalculated fee together with the job ID to the multifunction peripheral 200. In S235 the multifunction peripheral 200 receives this fee information and job ID.

In S237 the data processing server 100 determines whether the user must pay any additional fees (charges) by comparing the recalculation results in S231 with the already settled billing charges. When reprinting results in additional fees that are not covered by the settled charges (S237: YES), the data processing server 100 advances to S239.

In S239 the data processing server 100 performs the payment reservation process similarly to S79. That is, the data processing server 100 transmits a commodity ID as described above, an additional payment amount based on the calculation results in S231, the authentication information as described above, and a confirmation URL as described above to the transaction server 400. The additional payment amount is an example of the second fee. In response to this transmission, the data processing server 100 receives a payment URL that the user must access to pay the fee and a transaction ID related to the fee payment procedure from the transaction server 400. Note that the payment URL and the transaction ID received at this time are newly assigned for this additional payment and differ from the payment URL and transaction ID in S79 (FIG. 3). To avoid confusion, the new payment URL and transaction ID will be referred to as "payment URL 2" and "transaction ID 2" below. The transaction ID2 is an example of the second transaction identification information.

Next, in S241 the data processing server 100 associates the additional payment amount and the transaction ID 2 and payment URL 2 acquired in S239 with the job ID described above. In other words, the payment URL and transaction ID acquired in S79 are changed to the transaction ID 2 and payment URL 2 acquired in S239 as the URL and ID associated with the job ID for the print job. The processes of S239 and S241 are an example of the second settlement related process. As described earlier in FIG. 3, in S245 the data processing server 100 generates a bar code, such as a QR code, corresponding to the payment URL 2 and in S247 transmits data required for making the additional payment, including this QR code, to the multifunction peripheral 200. In addition to the QR code, the data required for the additional payment includes the payment URL 2 and the job ID.

In the meantime, the multifunction peripheral 200 determines in S249 whether the user must pay additional fees over the already settled charges based on the fee information received in S235. When there are additional fees to be paid (S249: YES), in S251 the multifunction peripheral 200 receives the data required for making the additional payment transmitted from the data processing server 100 in S247. As described above in S89 (FIG. 3), in S253 the multifunction peripheral 200 displays a prescribed additional payment screen on the display 240 showing the above data required for the additional payment that includes at least the QR code.

In S255 of FIG. 9, as in S91 described earlier, the user reads the QR code displayed in the additional payment screen with the mobile terminal 300, whereby a screen with the payment URL 2 is displayed on the mobile terminal 300. By accessing the payment URL 2 displayed in this screen, the user can display a fee display screen that includes the additional fee described above to learn the additional fee that the user must pay for the reprint.

When the user subsequently performs a suitable operation in the fee display screen, as in S105 (FIG. 3) described above, in S257 the mobile terminal 300 transmits a payment approval notification to the transaction server 400 indicating that the user approves of the payment process described above, i.e., that the user agrees to pay the additional fee.

After receiving the approval notification, in S259, as in S107 (FIG. 3) described above, the transaction server 400 transmits a confirmation URL to the mobile terminal 300 for confirming payment. In response, in S261 the mobile terminal 300 transmits a payment completion request to the data processing server 100, which the data processing server 100 receives. Consequently, in S263 the data processing server 100 determines that a payment completion request was received (S263: YES) and in S265, as in S113 (FIG. 3) described above, performs a process to confirm payment completion. Specifically, the data processing server 100 transmits the authentication information, the commodity ID, and the transaction ID 2 to the transaction server 400. In response, the data processing server 100 receives a return code from the transaction server 400.

Thereafter, in S267, as in S115 (FIG. 4) described above, the data processing server 100 transmits a payment completion notification to the mobile terminal 300 together with the job ID, and the mobile terminal 300 receives this notification in S269. Subsequently, in S271, as in S121 (FIG. 4) described above, the data processing server 100 transmits a print job including the scan data saved in the data storage area 125 to the multifunction peripheral 200 together with the corresponding job ID. In S273, as in S125 (FIG. 5) described above, the multifunction peripheral 200 receives the print job and the job ID transmitted in S271. In S275 the multifunction peripheral 200 controls the printing member 290 to restart execution of the acquired print job.

The multifunction peripheral 200 continues the reprint until execution of the print job is completed (S277: YES), and in S279, as in S131 (FIG. 4) described above, transmits a print completion notification to the data processing server 100 together with the job ID. In S281 the data processing server 100 receives the print completion notification from the multifunction peripheral 200 and in S283 deletes the scan data saved in the data storage area 125. This completes the process of FIG. 9.

On the other hand, when the data processing server 100 does not generate any additional fees in S237 (FIG. 7) described above (S237: NO), the data processing server 100 advances to S201 (FIG. 9) to determine whether a refund is to be issued to the user. When there is a refund (S201: YES), the data processing server 100 completes steps S202, S203, and S205 and advances to S213 described above. However, when a refund is not to be issued (S201: NO), the data processing server 100 advances directly to S213 described above. Since a reprint is to be executed in this case, the data processing server 100 determines in S213 that the flag F received in S197 (FIG. 7) is set to 1 (S213: YES) and performs steps S281 and S283 described above before ending the process of FIG. 9.

Similarly, when the multifunction peripheral 200 determines in S249 (FIG. 7) that no additional fees were generated (S249: NO), the multifunction peripheral 200 advances to S207 (FIG. 9) to determine whether a refund is to be issued. When there is a refund, the multifunction peripheral 200 advances to S209 described above. However, when a refund is not to be issued (S207: NO), the multifunction peripheral 200 advances directly to S211 described above. Since a reprint is being executed in this case, in S211 the multifunction peripheral 200 determines that the flag F is set to 1 (S211: YES) and advances to S275 described above. After completing steps S277 and S279, the multifunction peripheral 200 ends the process of FIG. 9.

In the sequence diagrams described above, the processes of S151, S165, S159 are an example of the post settlement step. The executed processes of S151, S165, S159, S153, S155, S157, S167, S169, S171, and S173 are an example of the first post fee settlement process, and the function of the processors 110 and 210 executing these processes are an example of the first post suspending processing portion.

The executed processes of S207, S209, S201, S202, S203, and S205 are an example of the second post fee settlement process. The processes of S275 and S277 are an example of the restart process, and the executed processes of S275 and S277 are an example of the second restart process and an example of the restart process. The function of the processors 110 and 210 executing the second post fee settlement process of S207, S209, S201, S202, S203, and S205 and the second restart process of S275 and S277 are an example of the second post suspending processing portion.

The first post fee settlement process of S151, S165, S159, S153, S155, S157, S167, S169, S171, and S173 and the second post fee settlement process of S207, S209, S201, S202, S203, and S205 are an example of the post fee settlement process. The function of the processors 110 and 210 executing the post fee settlement process of S151, S165, S159, S153, S155, S157, S167, S169, S171, S173 S207, S209, S201, S202, S203, and S205 and the restart process of S275 and S277 are an example of the post suspending processing portion, and these steps are an example of the post suspending step.

Effects of the Embodiment

As described above, printing on the printing system 1 of the present embodiment is executed by the printing member 290 of the multifunction peripheral 200 based on the print job for which the charged fee has been settled (S127). When the user wishes to halt printing for any reason after printing has begun, the user inputs a stop instruction via the "Pause Copy" button 241A to pause the job being printed (S133). This action prevents printing from continuing in the current state against the user's wishes. Further, since the user can quickly pause printing by operating the "Pause Copy" button 241A prior to inputting the reason for stoppage via the reason input buttons 242p-242v, this configuration is useful for halting printing as quickly as possible.

Once printing has been suspended in this way, the user inputs a reason for the stoppage via the reason input buttons 242p-242v. The process that the printing system 1 performs after this stoppage will be either a post fee settlement process or a restart process based on this input.

In the post fee settlement process, at least a portion of the charges paid for the print job is refunded (S157, S173, S159, S205, and S209). In the restart process, on the other hand, the multifunction peripheral 200 reprints the job that was paused as described above (S275) after the event that caused the user to operate the "Pause Copy" button 241A has been resolved, thereby completing this print job (S277, S279).

As described above, the printing system 1 according to the present embodiment selectively executes one of the post fee settlement process and the restart process after printing was suspended, rather than simply issuing a refund every time printing is suspended, as in the conventional method. Thus, depending on the reason that led the user to suspend printing, the printing system 1 can restart printing (S275) after the issue has been resolved, without issuing a refund or the like, thereby completing the print job (S277, S279). Accordingly, the user convenience can be improved.

A particular feature of the present embodiment is that the reason input buttons 242p-242v include the buttons 242p-242s and the buttons 242t-242v. When the user wishes to stop printing due to a malfunction of the printing system 1, the user inputs an instruction to halt printing through the buttons 242p-242s. When the user wishes to stop printing for another reason, the user may input an instruction to stop printing via the buttons 242t-242v. Thus, by having the user input a reason for stoppage from among two major categories, the printing system 1 can take different measures based on the category of the specified reason.

Another feature of the present embodiment is that when the user wishes to stop printing due to a problem occurring in the printing system 1, the user inputs an instruction to halt printing via the buttons 242p-242s, and the printing system 1 executes the corresponding process in S143-S181. When the user wishes to stop printing for any other reason, the user inputs an instruction to stop printing via the buttons 242t-242v, and the printing system 1 performs a corresponding process in S191-S283. By performing two different processes for the two types of reasons for stoppage in this way, the printing system 1 ensures that different measures are taken for each type of reason for stoppage.

Another feature of the present embodiment is that the printing system 1 has the multifunction peripheral 200 with the printing member 290, and the data processing server 100. This enables various processes other than printing to be performed on the data processing server 100, which is provided separately from the multifunction peripheral 200 that performs the printing itself. The user can then stop printing when a problem occurs on the multifunction peripheral 200 by inputting a stop instruction via the buttons 242p-242s provided on the multifunction peripheral 200 and can stop printing at the user's own discretion by inputting a stop instruction via the buttons 242t-242v provided on the multifunction peripheral 200.

Another feature of the present embodiment is that the buttons 242p-242s and the buttons 242t-242v are displayed on the display 240 when the user inputs an instruction to halt printing by operating the "Pause Copy" button 241A. Here, the user first inputs a stop instruction via the "Pause Copy" button 241A to suspend printing by the multifunction peripheral 200, and the multifunction peripheral 200 displays the buttons 242p-242s and buttons 242t-242v on the display 240. By inputting a stoppage instruction via the buttons 242p-242s or buttons 242t-242v displayed on the display 240, the user can clearly indicate whether the reason for stoppage was due to a problem occurring on the multifunction peripheral 200 or for the user's own convenience so that the printing system 1 can execute suitable measures based on the reason for stoppage.

Another feature of the present embodiment is that the user inputs an instruction via the buttons 242p-242s to halt printing based on either a malfunction of the multifunction peripheral 200 or a shortage of consumables. This allows the user to input an instruction to stop printing while clearly indicating that the reason for stoppage is the occurrence of a printing failure or conveyance malfunction on the multifunction peripheral 200 or that the multifunction peripheral 200 has run out of a consumable, such as paper, ink or toner, for example.

Another feature of the present embodiment is that a full refund is issued to the user for paid charges in response to input via the buttons 242p-242s (S151, S153, S157, and S159). The print job is deleted as well. This enables the user to be reimbursed rather than having to suffer a loss when printing is canceled due to no fault of the user.

Another feature of the present embodiment is that the multifunction peripheral 200 determines whether a malfunction has occurred on the multifunction peripheral 200 or whether the multifunction peripheral 200 has run out of a consumable, when the user has inputted an instruction to halt printing via the buttons 242p-242s (S147, S163). Thus, when the user were to indicate that a device malfunction or consumable shortage has occurred despite this assertion being false, the multifunction peripheral 200 can detect this as false input to prevent unauthorized use of the multifunction peripheral 200.

Another feature of the present embodiment is that the user operates the buttons 242t-242v to input an instruction to stop printing based on erroneous settings for various options related to the multifunction peripheral 200 or incorrect input to the multifunction peripheral 200. This enables the user to input an instruction to stop printing while clearly indicating that the reason for stoppage is due to the user's own fault, such as specifying incorrect print settings for the multifunction peripheral 200, supplying the wrong paper, or selecting the wrong tray.

Another feature of the present embodiment is that the multifunction peripheral 200 displays the print settings modification screen 244 when the user inputs an instruction to stop printing via the buttons 242t-242v. This enables the user to correct user mistakes such as incorrect print settings, incorrect paper or tray selections, and the like through suitable operations in the print settings modification screen 244.

Another feature of the present embodiment is that a partial refund for settled charges is issued to the user in response to input through the buttons 242t-242v (S205, S209). In this way, the user's relief is limited when printing cancellation is due to the user's fault, so that the provider of the printing system 1 does not suffer loss needlessly.

Another feature of the present embodiment is that a partial refund is not given for the portion of the print job that has been printed at the time of stoppage. This prevents the provider of the printing system 1 from needlessly suffering loss by having to provide relief for the printed portion of a job canceled on account of the user's fault.

Another feature of the present embodiment is that the multifunction peripheral 200 restarts a suspended print job (S275) after receiving reconfigured settings for the multifunction peripheral 200 in response to input via the buttons 242t-242v (S223) and completes the print job while reflecting (incorporating) the new settings (S277, S279). Thus, even when printing is halted due to incorrect settings caused by user error, the multifunction peripheral 200 can complete the print job as originally intended by reprinting the job using new settings inputted by the user.

Another feature of the present embodiment is that the data processing server 100 determines the fee for executing the print job in S77, and in S81 associates this fee with the job ID and the transaction ID. After payment for the print job has been completed with the transaction server 400, the multifunction peripheral 200 controls the printing member 290 to begin a print based on this print job (S127).

When the user subsequently operates the "Pause Copy" button 241A and inputs a reason for stoppage via the buttons 242t-242v as described above, and modifies the print settings in S229, in S231 the data processing server 100 calculates an additional fee required to complete the print job with the new settings being reflected therein. Thereafter, in S241 the data processing server 100 associates this additional fee with the same job ID described above and a different transaction ID 2 that differs from the transaction ID described above. After payment of this additional fee is completed through the transaction server 400, the multifunction peripheral 200 controls the printing member 290 to restart printing and to complete the original print job.

As described above, a print job can be shared by using the same job ID for printing executed prior to suspension and printing executed after the suspension, while performing separate transactions using different transaction IDs to facilitate the payment for each transaction.

Variations of the Embodiment

While the disclosure has been described in detail with reference to specific embodiments thereof, it would be apparent to those skilled in the art that many modifications and variations may be made therein without departing from the spirit of the invention.

(1) When Resuming Printing after Resolving a Problem with the Multifunction Peripheral While a full refund of charges is issued in response to input through the buttons 242p-242s in the embodiment described above, the present disclosure is not limited to this procedure.

That is, as in S275 and S277 executed in response to an instruction inputted through one of the buttons 242t-242v, the multifunction peripheral 200 may restart or resume printing to complete a print job after a conveyance abnormality or printing defect that was the reason for the above input is resolved or after the lack of ink or paper is resolved (ink or paper is replenished). The process to reprint printing and complete the print job executed by the processors 110 and 210 is an example of the first reprint process.

In this case, when the reason for stopping the print is not the user's fault and can be resolved, the multifunction peripheral 200 can reprint printing after the issue is resolved and can complete the print job as intended. This procedure also eliminates the need for issuing a refund to the user.

(2) When Print Jobs are Transmitted from a PC

In the above embodiment, the multifunction peripheral 200 scans an original in response to a copy operation issued by the user and executes a print job based on the scan data. However, in this variation, a separately provided PC transmits a print job including image data to the multifunction peripheral 200. This variation will be described below, wherein like parts and components to the above embodiment are designated with the same reference numerals to avoid duplicating description.

As depicted by the broken line in FIG. 1, the printing system 1 of the present variation includes a PC 500 in addition to the data processing server 100, the multifunction peripheral 200, the mobile terminal 300, and the transaction server 400. The PC 500 is connected to the network NT and can communicate with the data processing server 100, the multifunction peripheral 200, the mobile terminal 300, and the transaction server 400. The PC 500 is installed in the user's home or office in this example and is connected to the network NT via wired or wireless communications. While not shown in the drawings, the PC 500 has a processor, a storage, and an interface for connecting to the network NT.

Process Flow

Control procedures in the present variation will be described with reference to FIGS. 11 through 16. These control procedures represent processes executed by the processor 210 of the multifunction peripheral 200, the processor 110 of the data processing server 100, the processor of the transaction server 400, the processor of the mobile terminal 300, and the processor of the PC 500. As in the embodiment described above, references to these processors will be omitted in the following description. That is, expressions such as "the processor of the PC 500" and "by the processor of the PC 500" are simply expressed as "the PC 500" and "by the PC 500." Further, the term "scan data" in the above description of the embodiment will be replaced with the term "image data" in the following procedures where detailed descriptions of processes having identical content to the embodiment are omitted or simplified.

Sending/Receiving Print Jobs, Calculating Charges, and Printing

Figure 11:
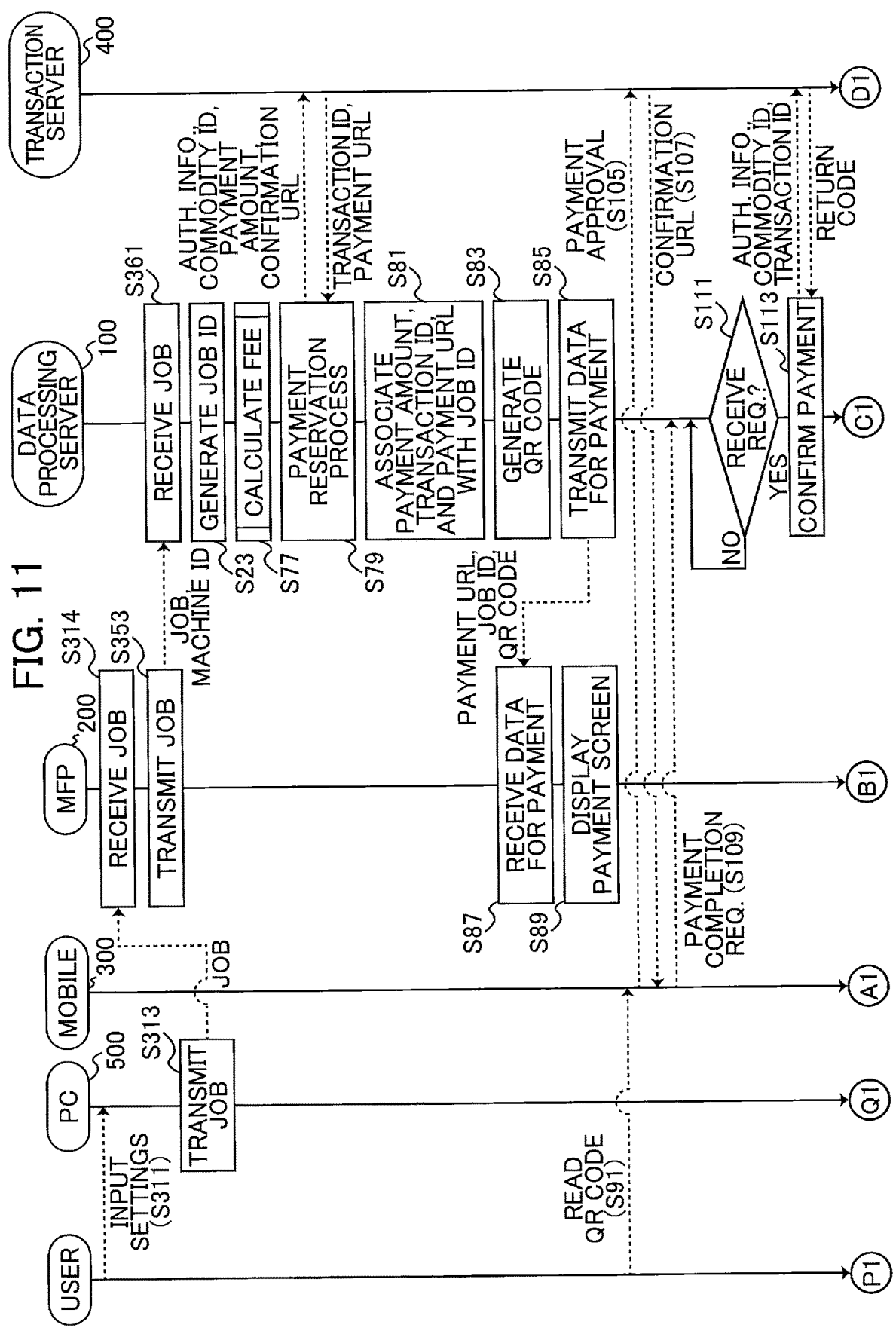
FIG. 11 is a sequence diagram illustrating a sequence flow executed by a PC terminal, a mobile terminal, a multifunction peripheral, a data processing server, and a transaction server.

The sequence diagram in FIG. 11 corresponds to FIG. 2 in the embodiment described above. In S311 of FIG. 11, the user inputs desired print settings into the PC 500 through operations on an operation interface of the PC 500. As in the embodiment described above, these print settings include a setting for the size of paper to be printed, a color setting for printing, a print density setting, a setting for the number of copies to be printed, a resolution setting, a print layout setting, and a selection for single-sided or double-sided printing.

In S313 the user performs a suitable operation on the operation interface of the PC 500 to transmit a print job including image data that has been prepared for printing to the multifunction peripheral 200. In S314 the multifunction peripheral 200 receives this print job.

In S353 the multifunction peripheral 200 transmits the print job, the machine ID, the printing settings, and the like to the data processing server 100, and the data processing server 100 receives this information in S361. In S23 the data processing server 100 generates a job ID and stores the print job and the like received from the multifunction peripheral 200 in association with this job ID.

Thereafter, the data processing server 100 executes the same steps S77-S85 described in the embodiment. That is, the data processing server 100 calculates a fee to be charged to the user and subsequently transmits data required for making a payment, including the payment URL acquired from the transaction server 400, and the corresponding QR code, to the multifunction peripheral 200. Upon receiving this information in S87, in S89 the multifunction peripheral 200 performs the same process described in the embodiment to display the payment screen. In S91 the user reads the QR code displayed in the payment screen using the mobile terminal 300 to acquire the payment URL and accesses this URL to display a fee display screen on the mobile terminal 300 where the user can learn the fee that must be paid.

Thereafter, the same steps S105-S113 described in the embodiment are executed on the printing system 1. That is, the mobile terminal 300 transmits a payment approval notification to the transaction server 400 and subsequently transmits a payment completion request to the data processing server 100. Upon receiving this request, the data processing server 100 performs a process to confirm payment completion and receives a return code from the transaction server 400.

Advancing to FIG. 12, the same steps S115 and S117 described above in the embodiment are executed on the printing system 1. Subsequently, the multifunction peripheral 200 executes step S127 described in the embodiment to begin printing the print job received from the PC 500 in S314. Note that rather than having the multifunction peripheral 200 execute the print job received in S314, in a separate step provided after step S117 the multifunction peripheral 200 may receive from the data processing server 100 the print job, which was sent to the data processing server 100 from the multifunction peripheral in S353 and received by the data processing server 100 in S361, and execute this print job. The process of S127 is an example of the printing step.

Process Performed when Printing is Interrupted

Figure 13A:
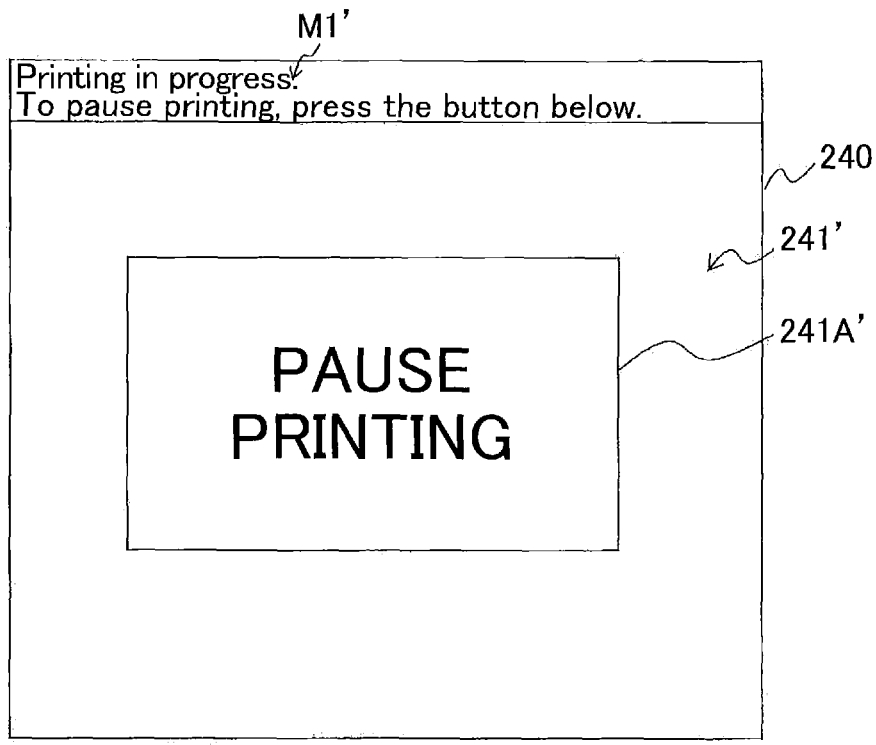
FIG. 13A is an explanatory diagram illustrating a pause operation screen.

In the present variation, as in the embodiment described above, a pause operation screen 241', such as that shown in FIG. 13A, is displayed on the display 240 while printing is being executed. The pause operation screen 241' includes a message M1' and a "Pause Printing" button 241A'. The message M1' is "Printing in progress. To pause printing, press the button below." The "Pause Printing" button 241A' is an example of the first instruction input portion.

Returning to FIG. 12, when the user operates the "Pause Printing" button 241A' in S129, in S131 the multifunction peripheral 200 receives this operation and in S133 temporarily halts printing by the printing member 290 that was initiated in S127. In this variation, the process of S131 is an example of the first instruction input step. The process of S133 is an example of the suspending controlling process. The function of the processor 210 to execute the process of S133 is an example of the suspending controlling portion.

Figure 13B:
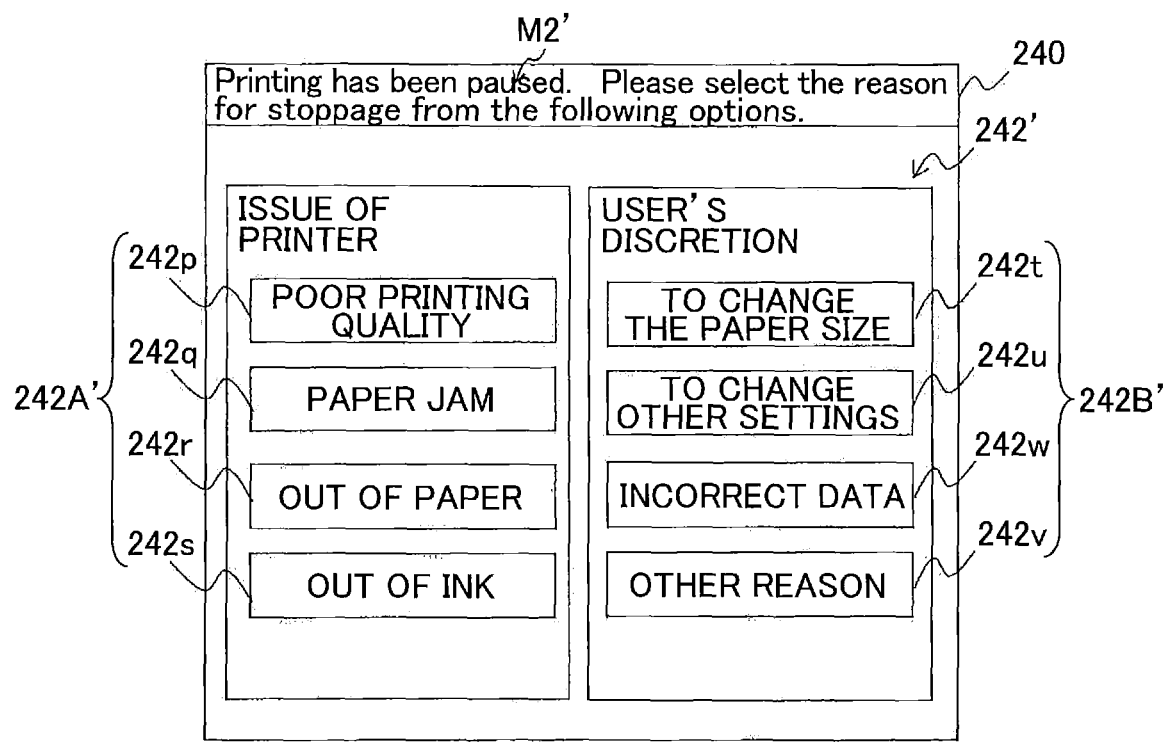
FIG. 13B is an explanatory diagram illustrating a reason input screen.

At the same time the multifunction peripheral 200 pauses printing, in S135 the multifunction peripheral 200 displays a reason input screen 242', such as that shown in FIG. 13B, on the display 240. The reason input screen 242' includes a message M2', a device-related section 242A', and a user-related section 242B'. The message M2' is "Printing has been paused. Please select the reason for stoppage from the following options."

As in the embodiment described above, the device-related section 242A' includes the "Poor printing quality" button 242p, "Paper jam" button 242q, "Out of paper" button 242r, and "Out of ink" button 242s. The buttons 242p, 242q, 242r, and 242s are examples of the first suspending input portion.

The user-related section 242B' includes the "To change the paper size" button 242t, "To change other settings" button 242u, and "Other reason" button 242v described above in the embodiment, as well as an "Incorrect data" button 242w. The user operates the "Incorrect data" button 242w when the data currently being printed, i.e., the print job is not the intended data due to incorrect settings, user input, or the like. The buttons 242t, 242u, 242v, and 242w are an example of the second pausing input portion. The buttons 242t-242w are examples of the second instruction input portion.

Figure 14:
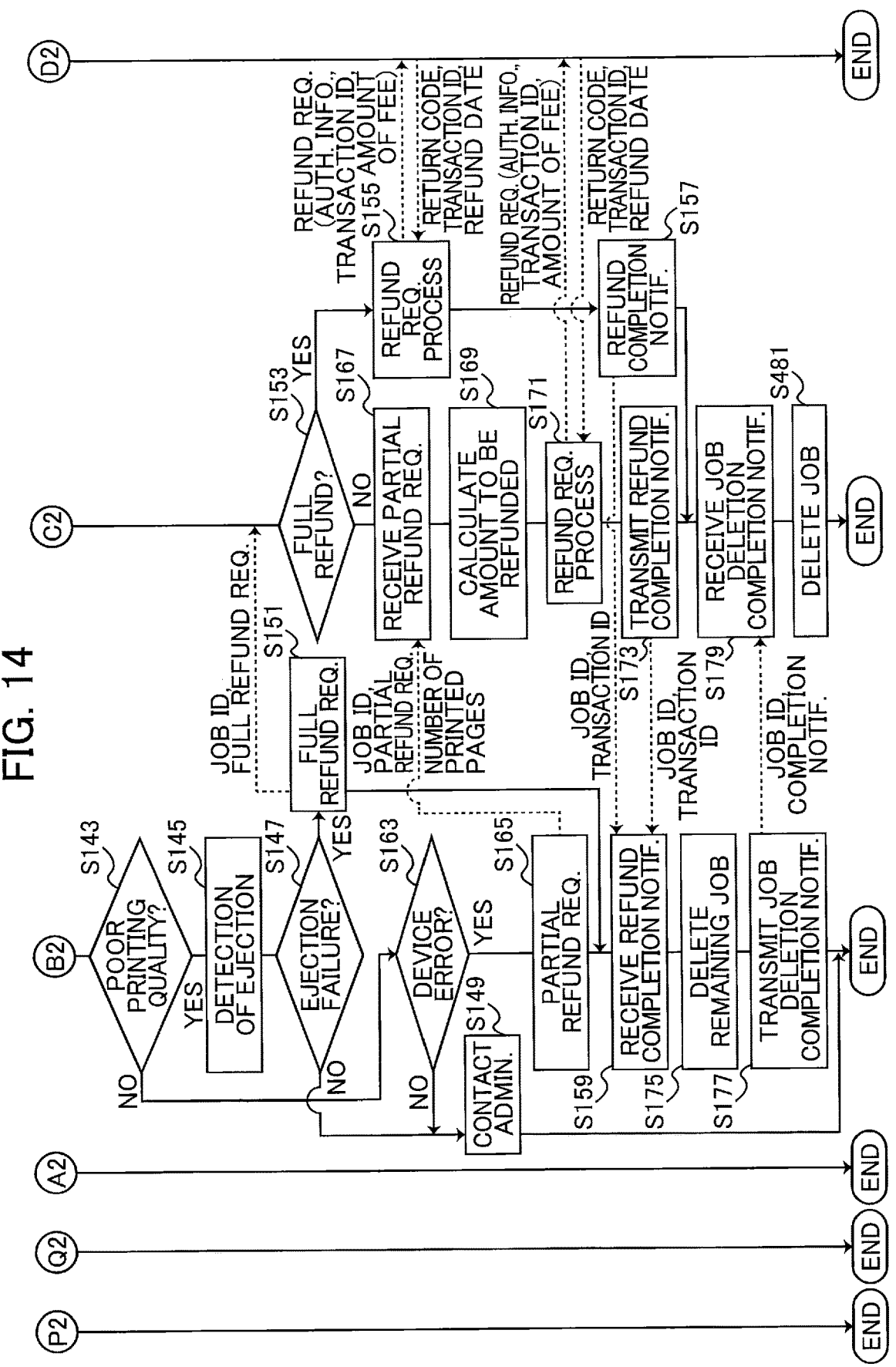
FIG. 14 is a sequence diagram showing a sequence flow continuing from the flow shown in FIG. 12.

Returning to FIG. 12, when the user operates one of the reason input buttons 242p-242w in S137, in S139 the multifunction peripheral 200 receives this operation and in S141 determines whether the button operation received in S139 is one of the buttons 242p-242s. When one of the buttons 242p-242s was operated (S141: YES), the process advances to S143 in FIG. 14. The process of S139 is an example of the second instruction input step. FIG. 14 corresponds to FIG. 6 of the embodiment. In the present variation, the process of S139 is an example of the second instruction input step.

Stoppage Due to an Issue with the Multifunction Peripheral

As shown in FIG. 14, the same steps S143-S179 described in the embodiment are performed on the printing system 1. In other words, a process for issuing a full refund to the user depending on the occurrence of ejection failures is performed when the "Poor printing quality" button 242p was operated, and a process for issuing a partial refund to the user depending on the occurrence of a device error is performed when one of the buttons 242q, 242r, and 242s was operated. In the present variation, the function of the processor 210 executing the processes of S163 and S145 is an example of the determining portion.

After receiving a refund completion notification in S159, the multifunction peripheral 200 deletes the remaining portion of the print job and in S177 transmits a job deletion completion notification for the corresponding job to the data processing server 100. In S481 the data processing server 100 deletes the print job that was received in S361 (FIG. 11) and stored in the data storage area 125 and subsequently ends the sequence in FIG. 14.

Stoppage at the User's Discretion

Figure 15:
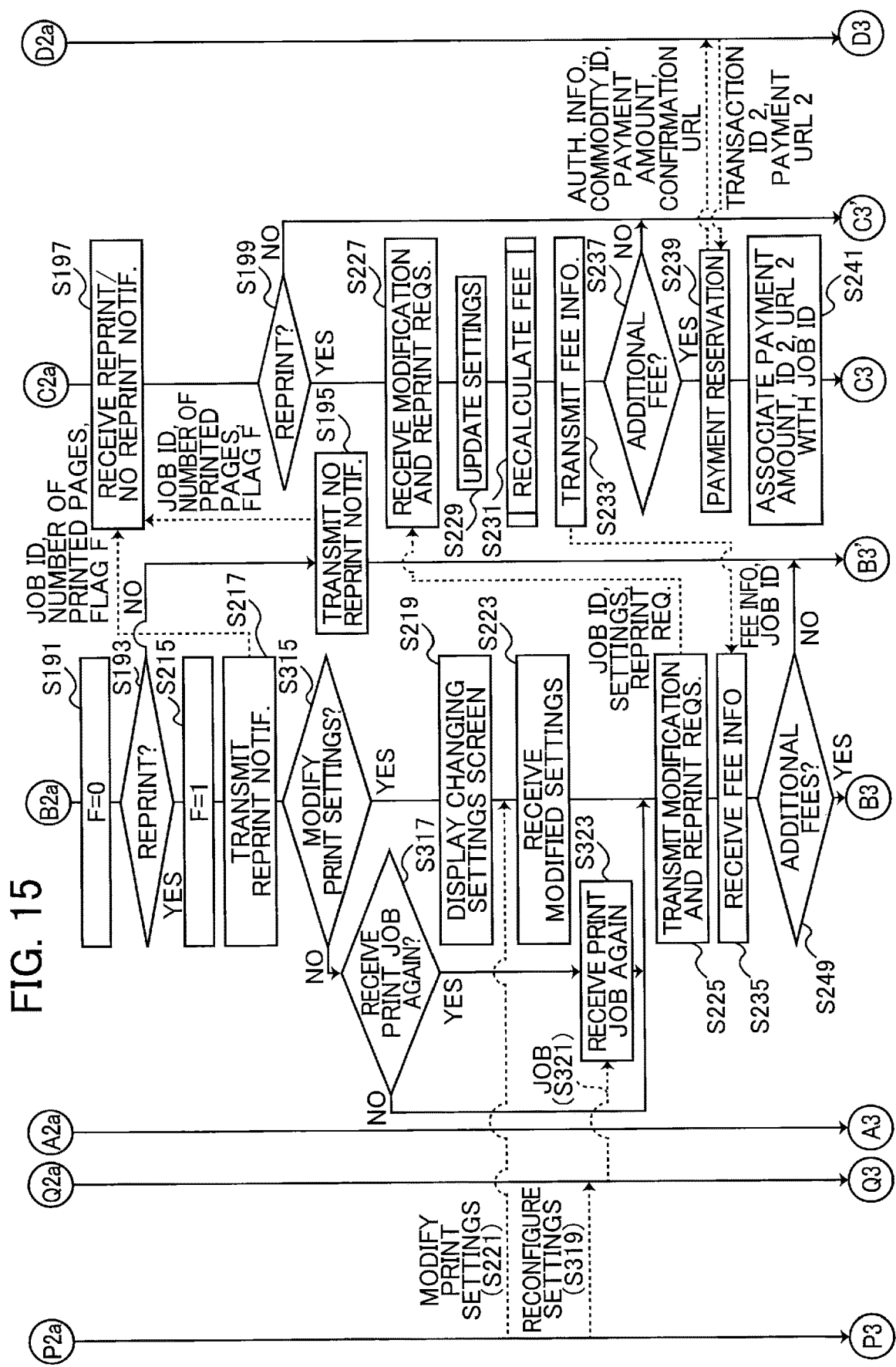
FIG. 15 is a sequence diagram showing a sequence flow continuing from the flow shown in FIG. 12.

On the other hand, when the multifunction peripheral 200 determines in S141 of FIG. 12 described above that the button operation received in S139 is an operation on one of the buttons 242t-242w signifying that printing was stopped at the user's discretion (S141: NO), the multifunction peripheral 200 advances to S191 in FIG. 15. FIG. 15 corresponds to FIG. 7 of the embodiment described above.

As shown in FIG. 15, the multifunction peripheral 200 executes step S191 and in S193 determines whether a reprint instruction was issued by the user, as in the embodiment described above. That is, the multifunction peripheral 200 determines whether the "Reprint" button 243A (FIG. 8) was operated in the reprint confirmation screen 243, which is displayed after one of the buttons 242t-242w shown in FIG. 13B was operated.

When not Reprinting

When the "Do not reprint" button 243B was operated (S193: NO), the remaining process is performed as described in the embodiment. Hence, a description of this process will be omitted.

When Reprinting

On the other hand, when the "Reprint" button 243A was operated (S193: YES), the multifunction peripheral 200 executes step S215 and in S217 transmits a reprint notification to the data processing server 100, as in the embodiment described above. Thereafter, in S315 the multifunction peripheral 200 determines whether the user wishes to modify print settings. Specifically, when the "Reprint" button 243A was operated in the reprint confirmation screen 243, the user can select either "Modify print settings" or "Do not modify print settings" in a separate screen, an interrupt window, or the like (not shown). Thus, in S315 the multifunction peripheral 200 determines whether the user selected "Modify print settings" in this separate screen or the like.

When "Modify print settings" was selected (S315: YES), the process advances to S225 after the same steps S219, S221, and S223 described in the above embodiment are executed.

When "Do not modify print settings" was selected (S315: NO), in S317 the multifunction peripheral 200 determines whether the user wished to receive the print job from the PC 500 again. Specifically, when "Do not modify print settings" described above was selected, the user can select one of "Re-receive the print job" or "Do not re-receive the print job" in a separate screen, interrupt window, or the like (not shown). Thus, in S317 the multifunction peripheral 200 determines whether the user selected "Re-receive the print job" from this separate screen or the like.

When "Do not re-receive the print job" was selected (S317: NO), the process advances directly to S225. However, when "Re-receive the print job" was selected (S317: YES), in S323 the multifunction peripheral 200 receives a print job re-transmitted from the PC 500 in S321 after the user has configured suitable print settings on the PC 500 in S319. The process subsequently advances to S225.

Figure 16:
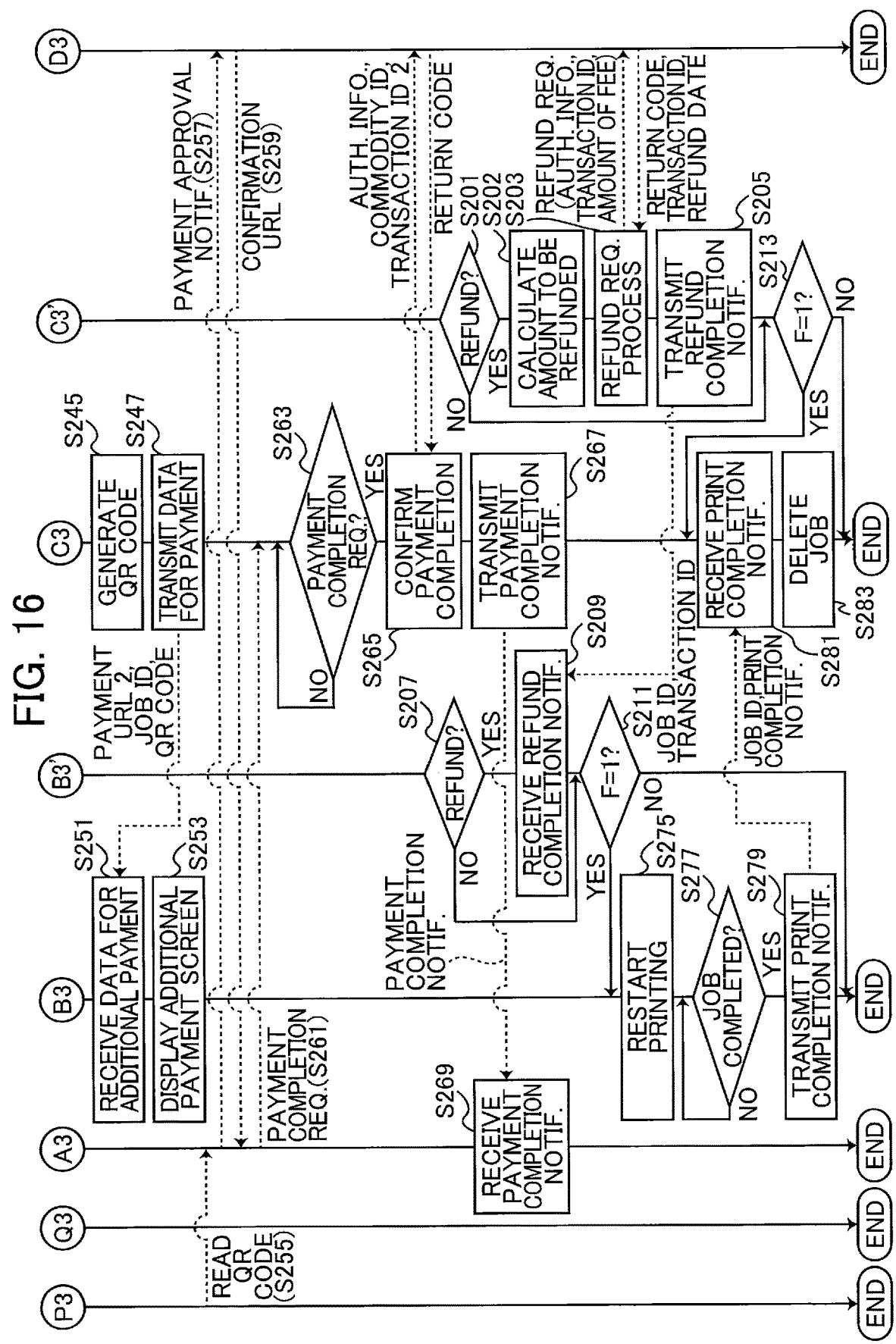
FIG. 16 is a sequence diagram showing a sequence flow continuing from the flow shown in FIG. 15.

From S225, the same process described in the embodiment is performed through S269 of FIG. 16, which roughly corresponds to FIG. 9 in the embodiment. That is, in S231 the data processing server 100 re-calculates the fee in response to the reprint request to suitably reflect the print settings modified in S221 or S229 and, when the reprint results in additional fees, acquires a new transaction ID 2 and payment URL 2 from the transaction server 400 in the payment reservation process. After the mobile terminal 300 issues payment approval based on this acquired information to the transaction server 400 (S257 of FIG. 16) and subsequently transmits a payment completion request to the data processing server 100 (S259), the data processing server 100 performs a process to confirm payment completion (S265) and receives a return code from the transaction server 400.

Next, in S267 the data processing server 100 transmits a payment completion notification that the mobile terminal 300 receives in S269.

Subsequently, in S275 the multifunction peripheral 200 controls the printing member 290 to restart printing of the print job received in S314, as described in the embodiment, or the print job re-received in S323 (FIG. 15). The remaining process through step S283 is identical to that in the embodiment described above.

In the sequence diagrams of FIGS. 11, 12, and 14-16, the processes of S151, S165, S159 are an example of the post settlement step. The executed processes of S151, S165, S159, S153, S155, S157, S167, S169, S171, and S173 are an example of the first post fee settlement process, and the function of the processors 110 and 210 executing these processes are an example of the first post suspending processing portion. The processes of S275 and S277 are an example of the restart process.

The executed processes of S207, S209, S201, S202, S203, and S205 are an example of the second post fee settlement process. The processes of S275 and S277 are an example of the restart process, and the executed processes of S275 and S277 are an example of the second restart process and an example of the restart process. The function of the processors 110 and 210 executing the second post fee settlement process of S207, S209, S201, S202, S203, and S205 and the second restart process of S275 and S277 are an example of the second post suspending processing portion.

The first post fee settlement process of S151, S165, S159, S153, S155, S157, S167, S169, S171, and S173 and the second post fee settlement process of S207, S209, S201, S202, S203, and S205 are an example of the post fee settlement process. The function of the processors 110 and 210 executing the post fee settlement process of S151, S165, S159, S153, S155, S157, S167, S169, S171, S173 S207, S209, S201, S202, S203, and S205 and the restart process of S275 and S277 are an example of the post suspending processing portion, and these steps are an example of the post suspending step.

The configuration of the present variation can obtain the effects the same as the first embodiment.

That is, printing on the printing system 1 according to the above variation is executed by the printing member 290 of the multifunction peripheral 200 based on the print job for which the charged fee has been settled (S127). In a case that the user wishes to halt printing for any reason after printing has begun, the user inputs a stop instruction via the "Pause Printing" button 241A' to pause the job being printed (S133). This action prevents printing from continuing in the current state against the user's wishes. Further, since the user can quickly pause printing by operating the "Pause Printing" button 241A' prior to inputting the reason for stoppage via the reason input buttons 242p-242w, this configuration is useful for halting printing as quickly as possible.

Once printing has been suspended in this way, the user inputs a reason for the stoppage via the reason input buttons 242p-242w. The process that the printing system 1 performs after this stoppage will be either a post fee settlement process or a restart process based on this input.

In the post fee settlement process, at least a portion of the charges paid for the print job is refunded (S157, S173, S159, S205, and S209). In the restart process, on the other hand, the multifunction peripheral 200 reprints the print job that was paused as described above (S275) after the event that caused the user to operate the "Pause Printing" button 241A' has been resolved, thereby completing this print job (S277, S279).

As described above, the printing system 1 according to the present variation selectively executes one of the post fee settlement process and restart process after printing was suspended, rather than simply issuing a refund every time printing is suspended, as in the conventional method. Thus, depending on the reason that led the user to suspend printing, the printing system 1 can reprint printing (S275) after the issue has been resolved, without issuing a refund or the like, thereby completing the print job (S277, S279). Accordingly, the user convenience can be improved.

Another feature of the present variation is that the buttons 242p-242s and the buttons 242t-242w are displayed on the display 240 when the user inputs an instruction to halt printing by operating the "Pause Printing" button 241A'. When the user wishes to halt printing, the user first inputs a stop instruction via the "Pause Printing" button 241A' to suspend printing by the multifunction peripheral 200, and the multifunction peripheral 200 displays the buttons 242p-242s and buttons 242t-242w on the display 240. By inputting a stoppage instruction via the buttons 242p-242s or buttons 242t-242w displayed on the display 240, the user can clearly indicate whether the reason for stoppage was due to a problem occurring on the multifunction peripheral 200 or for the user's own convenience so that the printing system 1 can execute suitable measures for the reason of stoppage.

Another feature of the present variation is that the user operates the buttons 242t-242w to input an instruction to stop printing based on erroneous settings for various options related to the multifunction peripheral 200 or incorrect input to the multifunction peripheral 200. This enables the user to input an instruction to stop printing while clearly indicating that the reason for stoppage is due to the user's own fault, such as a mistake in the print settings for the multifunction peripheral 200, an incorrect paper specification or tray selection, or an incorrect data designation when transmitting image data from the PC 500, for example.

Another feature of the present variation is that the multifunction peripheral 200 displays the print settings modification screen 244 when the user inputs an instruction to stop printing via the buttons 242t-242w, as in the embodiment described above. This enables the user to correct user mistakes such as the aforementioned incorrect print settings, incorrect paper or tray selection, incorrect data selection, and the like through suitable operations in the print settings modification screen 244.

Another feature of the present variation is that, as in the embodiment described above, a partial refund for settled charges is issued to the user in response to input through the buttons 242t-242w (S205, S209). In this way, the user's relief is limited when printing cancellation is due to the user's own fault, so that the provider of the printing system 1 does not suffer loss needlessly.

Another feature of the present variation is that the multifunction peripheral 200 reprints a paused print job (S275) after receiving reconfigured settings for the multifunction peripheral 200 in response to input via the buttons 242t-242w (S223) and completes the print job while reflecting the new settings (S277, S279). Thus, as in the embodiment described above, even when printing is halted due to incorrect settings caused by user error, the multifunction peripheral 200 can complete the print job as originally intended by reprinting the job using new settings inputted by the user.

(3) Other Variations

The present invention is not limited to the case of issuing a full or partial refund to the user, as in the above description. Specifically, rather than a monetary refund as described above, the user may be provided with other benefits equivalent to the refund amount (fee, cash, or money equivalent). Examples of such benefits may include the issuance of a discount or voucher corresponding to the refund amount, the granting of points or miles, and the granting of some other preferential right.

Further, when a print job is restarted, entire pages in the print job may be printed again, that is, the reprint may be executed from the beginning of the original print job. Or, when restarted, the print job may be resumed. That is, only the unprinted portion (pages) of a suspended print job may reprinted when restarting a print job. Alternatively, the multifunction peripheral 200 may execute a reprint beginning from the portion of the print job slightly before (or vicinity of) the unprinted portion, so as to overlap the end of the printed portion. Alternatively, the reprint may be executed from the beginning of the original print job. When pages to be printed a second time, payment of any additional fees that include those pages to be printed a second time are settled according to the method described above.

Further, a suitable screen may be displayed on the display 240 to allow the user to select whether to reprint only the unprinted portion or to begin from a portion just before (vicinity of) the unprinted portion, or to reprint the entire print job from the beginning so that an end part of the printed portion is reprinted. Hence, this method allows the user to select a desired manner of reprinting from multiple options, thereby improving user convenience.

While the present disclosure was applied to the multifunction peripheral 200 that prints according to the inkjet method in the above description, the same effects can be obtained when applying the present disclosure to a multifunction peripheral 200 that prints according to the laser method. Further, the disclosure is not limited to the inkjet and laser printing methods but may be applied to printing devices that print using another well-known method such as the thermal transfer method.

The sequence charts of FIGS. 2-4, 6, 7, 9, 11, 12, and 14-16 are examples but not limit the present disclosure, and thus one or more steps or processes may be added deleted, and/or processing order may be modified without modifying the scope or concept of the present invention.

In addition to what has already been described, the methods according to the embodiment and its variations described above may be used in suitable combinations.

In addition, although not illustrated individually, the present disclosure may be implemented with various modifications without departing from the spirit of the disclosure.

What is claimed is:

1. A printing system comprising:
   a printing device having
      a printing member configured to perform printing, and
      a display,
   wherein the printing system is configured to perform:
      controlling the printing member to perform printing based on a print job for which a charged fee is already settled;
      receiving an instruction to suspend the printing started by the printing member;
      suspending the printing started by the printing member in response to reception of the instruction;
      displaying, on the display, a reason reception screen to receive reason information indicating a reason to suspend printing;
      receiving the reason information inputted through the reason reception screen;
      determining, on a first condition including a condition that the reason information is first information indicating that the reason to suspend printing is based on an issue of the printing device, a post fee-settlement process as a post suspending process, wherein the post suspending process is to be executed after the printing is suspended, the issue of the printing device being one of a malfunction of the printing device and a shortage of a consumable used in the printing device, wherein the post fee-settlement process is related to a provision of a benefit corresponding to refunding at least part of the charged fee;

executing, when the post fee-settlement process is determined as the post suspending process, the post fee-settlement process as the post suspending process;

determining, on a second condition including a condition that the reason information is second information indicating that the reason to suspend printing is a discretion of a user of the printing device, a restart process as the post suspending process, the restart process being to restart the suspended printing to complete printing based on the print job after the issue of the printing device is resolved; and executing, when the restart process is determined as the post suspending process, the restart process to complete printing based on the print job as the post suspending process.

2. The printing system according to claim 1, further comprising:

a data processing server, wherein the printing device further has a conveying mechanism configured to convey a printing medium on which the printing member performs printing, and wherein the printing device is configured to perform the controlling, the receiving the instruction, the suspending, the displaying the reason reception screen, the receiving the reason information, the determining the post fee-settlement process, the executing the post fee-settlement process, the determining the restart process, and the executing the restart process.

3. The printing system according to claim 2, wherein the second information specifies that the reason to suspend printing is based on an incorrect print setting or incorrect input.

4. The printing system according to claim 3, wherein the printing system is configured to further perform displaying, on the display, a setting screen to receive an updated print setting to correct the incorrect print setting or the incorrect input when the second information is received.

5. The printing system according to claim 3, wherein the data processing server is configured to further perform:

a post settlement process on a third condition including a condition that the reason information is the second information, and a condition that an operation specifying a process other than the restart process is received, the post settlement process being to provide refunding a part of the charged fee or provide a benefit corresponding to the part of the charged fee.

6. The printing system according to claim 5, wherein the post settlement process provides neither refunding for a part of the print job for which the printing is already performed nor providing benefit for the part of the print job.

7. The printing system according to claim 3, wherein the restart process includes a restart sub-process to restart the suspended printing and to complete the print job after receiving an updated setting of the printing and reflecting the updated setting in the print job.

8. The printing system according to claim 7, wherein the restart sub-process performs:

restarting printing based on the print job from a suspended page at which the printing is suspended or a page vicinity of the suspended page; or restarting printing from a first page defined in image data included in the print job.

9. The printing system according to claim 7, the printing system being further configured to perform:

determining a first fee required for performing the print job; and a first association process to associate, with the first fee, job identification information identifying the print job and first transaction identification information to be used for settling payment of the first fee, wherein the controlling starts printing based on the print job in response to completion of the payment of the first fee performed by a transaction server by using the first transaction identification information associated with the first fee, wherein the restart process includes:

determining a second fee required for completing printing based on the print job when the updated print setting is received; and a second association process to associate, with the second fee, the job identification information and second transaction identification information to be used for settling payment of the second fee, and wherein the restart sub-process restarts the suspended printing in response to completion of payment of the second fee by using the second transaction identification information associated with the second fee.

10. The printing system according to claim 1, wherein the malfunction of the printing device includes at least one of an occurrence of a printing defect and an occurrence of an abnormality in a conveying mechanism provided in the printing device.

11. The printing system according to claim 10, wherein the data processing server is configured to perform, when the post fee-settlement process is determined as the post suspending process, a post process in which a post settlement process and a deletion process are performed, the post settlement process being to refund all of the charged fee or to provide a benefit corresponding to the all of the charged fee, the deletion process being to delete the print job.

12. The printing system according to claim 10, configured to further perform:

determining whether the malfunction of the printing device or the shortage of the consumable has occurred when the instruction is received.

13. The printing system according to claim 1, wherein the printing device is configured to perform a post-process on a third condition including a condition that the reason information is the first information indicating that the reason to suspend printing is based on an issue of the printing device, and a condition that the issue is resolved, the post-process being to restart the suspended printing and to complete the print job.

14. The printing system according to claim 1, wherein the printing system is configured to further perform:

displaying, when the restart process is determined as the post suspending process, a setting screen to receive updated print settings of printing based on the print job on the display; and receiving, when the setting screen is displayed, the updated print settings, wherein when the updated print settings are received, the restart process as the post suspending process is performed while reflecting the updated print settings.

15. A printing device comprising:
a printing member configured to perform printing;
a display; and
a processor configured to perform:
controlling the printing member to perform printing based on a print job for which a charged fee is already settled;
receiving an instruction to suspend the printing started by the printing member;
suspending the printing started by the printing member in response to reception of the instruction;
displaying, on the display, a reason reception screen to receive reason information indicating a reason to suspend printing;
receiving the reason information inputted through the reason reception screen;
determining, on a first condition including a condition that the reason information is first information indicating that the reason to suspend printing is based on an issue of the printing device, a post fee-settlement process as a post suspending process, wherein the post suspending process is to be executed after the printing is suspended, the issue of the printing device being one of a malfunction of the printing device and a shortage of a consumable used in the printing device, wherein the post fee-settlement process is related to a provision of a benefit corresponding to refunding at least part of the charged fee,
executing, when the post fee-settlement process is determined as the post suspending process, the post fee-settlement process as the post suspending process;
determining, on a second condition including a condition that the reason information is second information indicating that the reason to suspend printing is a discretion of a user of the printing device, a restart process as the post suspending process, the restart process being to restart the suspended printing to complete printing based on the print job after the issue of the printing device is resolved; and
executing, when the restart process is determined as the post suspending process, the restart process to complete printing based on the print job as the post suspending process.

16. A method comprising:
controlling a printing member included in a printing device having a display to perform printing based on a print job for which a charged fee is already settled;
receiving an instruction to suspend the printing started by the printing member;
suspending the printing started by the printing member in response to reception of the instruction;
displaying, on the display, a reason reception screen to receive reason information indicating a reason to suspend printing;
receiving the reason information inputted through the reason reception screen;
determining, on a first condition including a condition that the reason information is first information indicating that the reason to suspend printing is based on an issue of the printing device, a post fee-settlement process as a post suspending process, wherein the post suspending process is to be executed after the printing is suspended, the issue of the printing device being one of a malfunction of the printing device and a shortage of a consumable used in the printing device, wherein the post fee-settlement process is related to a provision of a benefit corresponding to refunding at least part of the charged fee,
executing, when the post fee-settlement process is determined as the post suspending process, the post fee-settlement process as the post suspending process;
determining, on a second condition including a condition that the reason information is second information indicating that the reason to suspend printing is a discretion of a user of the printing device, a restart process as the post suspending process, the restart process being to restart the suspended printing to complete printing based on the print job after the issue of the printing device is resolved; and
executing, when the restart process is determined as the post suspending process, the restart process to complete printing based on the print job as the post suspending process.

17. A non-transitory computer readable storage medium storing a set of program instructions installed on and executed by a computer in a printing device, the printing device further including a printing member configured to perform printing and a display, the set of program instructions when executing by the computer causing the image reading apparatus to perform:
controlling the printing member to perform printing based on a print job for which a charged fee is already settled;
receiving a suspending instruction to suspend the printing started by the printing member;
suspending the printing started by the printing member in response to reception of the suspending instruction;
displaying, on the display, a reason reception screen to receive reason information indicating a reason to suspend printing;
receiving the reason information inputted through the reason reception screen;
determining, on a first condition including a condition that the reason information is first information indicating that the reason to suspend printing is based on an issue of the printing device, a post fee-settlement process as a post suspending process, wherein the post suspending process is to be executed after the printing is suspended, the issue of the printing device being one of a malfunction of the printing device and a shortage of a consumable used in the printing device, wherein the post fee-settlement process is related to a provision of a benefit corresponding to refunding at least part of the charged fee,
executing, when the post fee-settlement process is determined as the post suspending process, the post fee-settlement process as the post suspending process;
determining, on a second condition including a condition that the reason information is second information indicating that the reason to suspend printing is a discretion of a user of the printing device, a restart process as the post suspending process, the restart process being to restart the suspended printing to complete printing based on the print job after the issue of the printing device is resolved; and
executing, when the restart process is determined as the post suspending process, the restart process to complete printing based on the print job as the post suspending process.

* * * * *